United States Patent
Fukuda

(10) Patent No.: US 11,972,162 B2
(45) Date of Patent: Apr. 30, 2024

(54) IMAGE PROCESSING SYSTEM USING AUTHENTICATION INFORMATION ACQUIRED THROUGH TWO-FACTOR AUTHENTICATION, METHOD FOR CONTROLLING IMAGE PROCESSING SYSTEM, AND STORAGE MEDIUM

(71) Applicant: CANON KABUSHIKI KAISHA, Tokyo (JP)

(72) Inventor: Masato Fukuda, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/816,983

(22) Filed: Aug. 2, 2022

(65) Prior Publication Data

US 2023/0050211 A1     Feb. 16, 2023

(30) Foreign Application Priority Data

Aug. 11, 2021   (JP) ................................ 2021-131091

(51) Int. Cl.
*G06F 3/12*        (2006.01)
*H04L 9/40*        (2022.01)

(52) U.S. Cl.
CPC .......... *G06F 3/1238* (2013.01); *G06F 3/1222* (2013.01); *H04L 63/083* (2013.01); *H04L 2463/082* (2013.01)

(58) Field of Classification Search
None
See application file for complete search history.

(56) References Cited

U.S. PATENT DOCUMENTS

| 2004/0117389 A1* | 6/2004 | Enami ................... G06F 3/1292 |
| 2009/0207434 A1* | 8/2009 | Tanaka ................. H04N 1/0087 |
| | | 358/1.14 |
| 2010/0239093 A1* | 9/2010 | Hotta ...................... G06F 21/35 |
| | | 358/1.14 |

FOREIGN PATENT DOCUMENTS

JP       2004-185629 A     7/2004

* cited by examiner

*Primary Examiner* — Thomas D Lee
(74) *Attorney, Agent, or Firm* — Canon U.S.A., Inc. IP Division

(57) ABSTRACT

To control an image forming apparatus using a service on a network, an information terminal performs two-factor authentication and acquires authentication information through the two-factor authentication so that the image forming apparatus accesses the service.

10 Claims, 33 Drawing Sheets

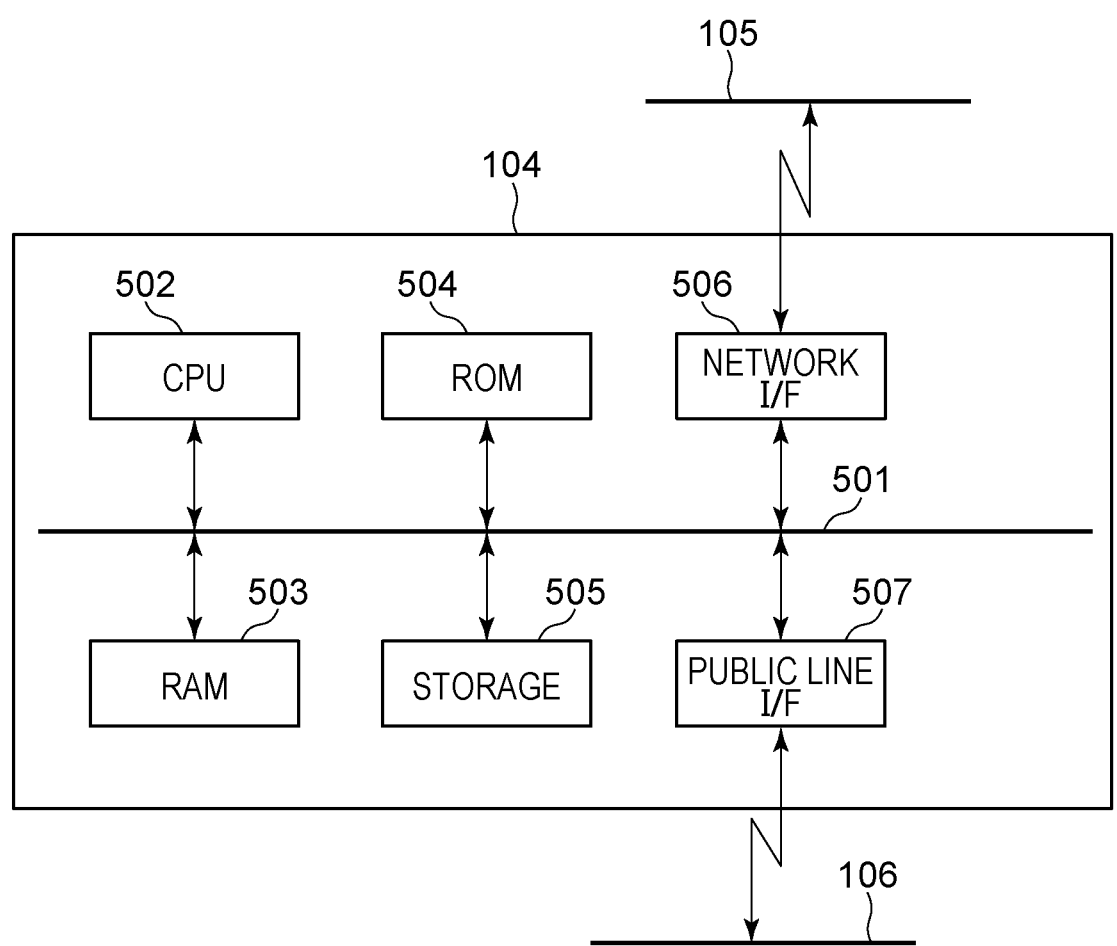

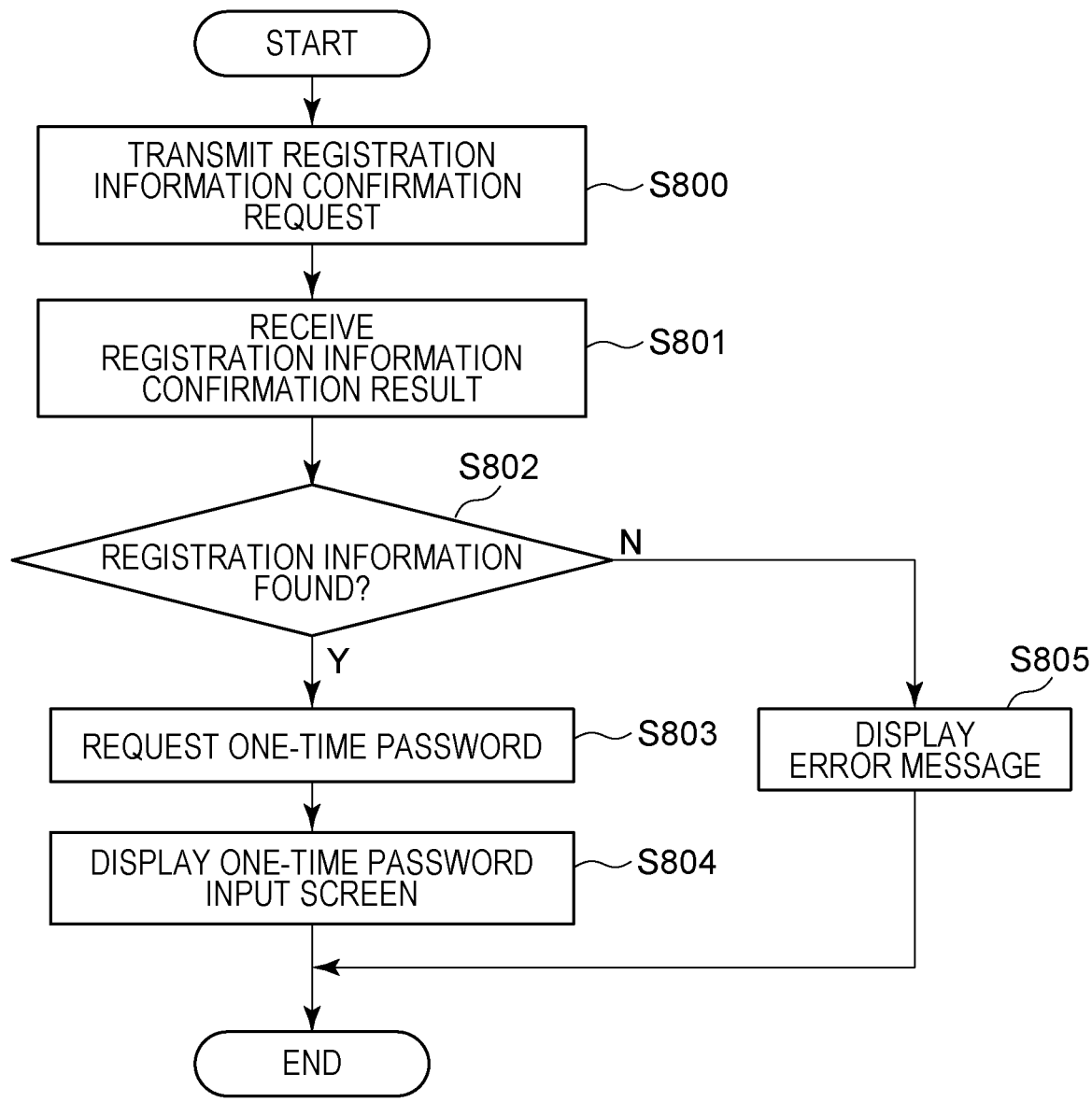

FIG. 13

```
POST /scanJob HTTP/1.1
Host:192.168.1.100
Content-Type: text/xml
Content-Length:240

<?xml version="1.0" encoding="UTF-8"?>
  <ScanJob>
    <ColorMode>Color</ColorMode>
    <Resolution>300</Resolution>
    <Input>Feeder</Input>
    <Destination>
        <Uri>https://aaa.com/Storage1</Uri>
        <AuthInfo>dXNlcjE6cGFzc3dvcmQx</AuthInfo>
    </Destination>
  </ScanJob>
```

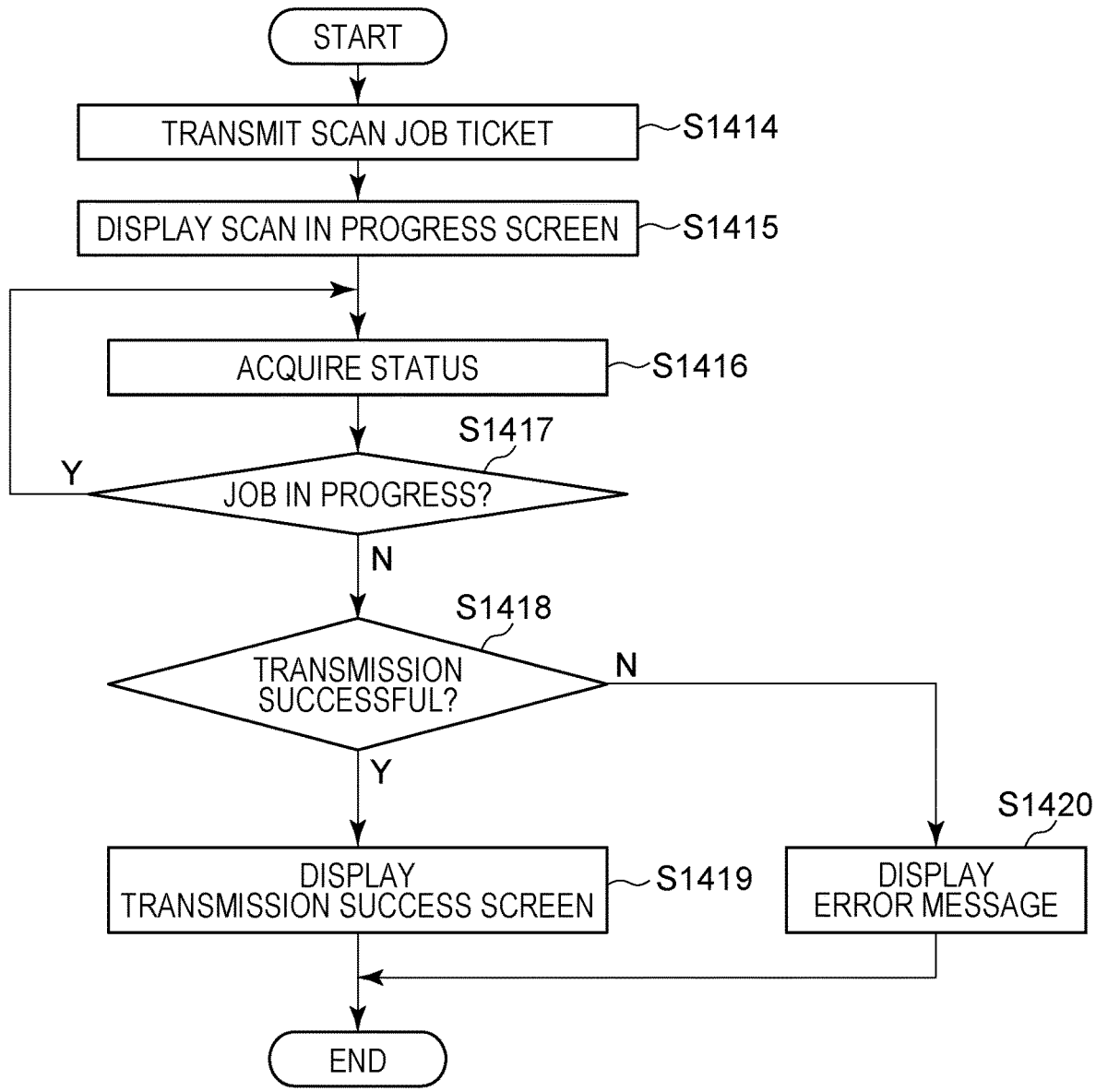

FIG. 17

```
POST /printJob HTTP/1.1
Host:192.168.1.100
Content-Type: text/xml
Content-Length:215

<?xml version="1.0" encoding="UTF-8"?>
  <PrintJob>
    <ColorMode>Color</ColorMode>
    <Plex>Simplex</Plex>
    <Location>
      <Uri>https://aaa.com/Storage1/aaa.pdf</Uri>
      <Password>dXNlcjE6cGFzc3dvcmQx</Password>
    </Location>
  </PrintJob>
```

FIG. 22

```
POST /scanJob HTTP/1.1
Host:192.168.1.100
Content-Type: text/xml
Content-Length:172

<?xml version="1.0" encoding="UTF-8"?>
   <ScanJob>
      <ColorMode>Color</ColorMode>
      <Resolution>300</Resolution>
      <Input>Feeder</Input>
      <Uri>https://aaa.com/Storage1</Uri>
   </ScanJob>
```

FIG. 23

```
POST /authorization HTTP/1.1
Host:192.168.1.100
Content-Type: text/xml
Content-Length:148

<?xml version="1.0" encoding="UTF-8"?>
   <Authorization>
        <Uri>https://aaa.com/Storage1</Uri>
        <Password>dXNlcjE6cGFzc3dvcmQx</Password>
   </Authorization>
```

# IMAGE PROCESSING SYSTEM USING AUTHENTICATION INFORMATION ACQUIRED THROUGH TWO-FACTOR AUTHENTICATION, METHOD FOR CONTROLLING IMAGE PROCESSING SYSTEM, AND STORAGE MEDIUM

BACKGROUND

Field of the Disclosure

The present disclosure relates to an image processing system, a method for controlling the image processing system, and a storage medium that enable a user to use a service provided on a network by sending authentication information for the service from an information terminal to an image forming apparatus so that the image forming apparatus need not perform an authentication process for accessing the service.

Description of the Related Art

A technique is disclosed in which authentication information corresponding to a user is acquired from a user management server, login processing is performed and, thereafter, a job is executed by an image forming apparatus on the basis of a job ticket acquired from the server (refer to Japanese Patent Laid-Open No. 2004-185629).

According to existing techniques, any user who knows the authentication information can use the image processing apparatus, so that if the authentication information is stolen, a malicious user may be able to use the service via the image processing apparatus.

SUMMARY

According to embodiments of the present disclosure, an image processing system includes an image processing apparatus including a reading unit configured to read a document and a sender unit configured to transmit, to an external apparatus, image data generated by the reading unit reading the document, a receiving unit configured to receive user information, a transmitting unit configured to transmit the user information received by the receiving unit to an authentication server, and an inputting unit configured to input a code transmitted from the authentication server to an apparatus corresponding to the user information transmitted by the transmitting unit. The sender unit of the image processing apparatus transmits the image data to the external apparatus in response to the input of the code by the inputting unit.

Further features of the present disclosure will become apparent from the following description of exemplary embodiments with reference to the attached drawings.

BRIEF DESCRIPTION OF THE DRAWINGS

FIG. 5 is a block diagram of the configuration of an authentication server according to the embodiment.

FIGS. 8A and 8B are flowcharts of a service URL registration process according to the embodiment.

FIG. 13 illustrates an example of a first scan job ticket according to the embodiment.

FIGS. 14A to 14C are flowcharts relating to a scan job process according to the embodiment.

FIG. 17 illustrates a print job ticket according to the embodiment.

FIG. 22 illustrates an example of a second scan job ticket according to the embodiment.

FIG. 23 illustrates an example of an authentication ticket according to the embodiment.

DESCRIPTION OF THE EMBODIMENTS

Figure 1:
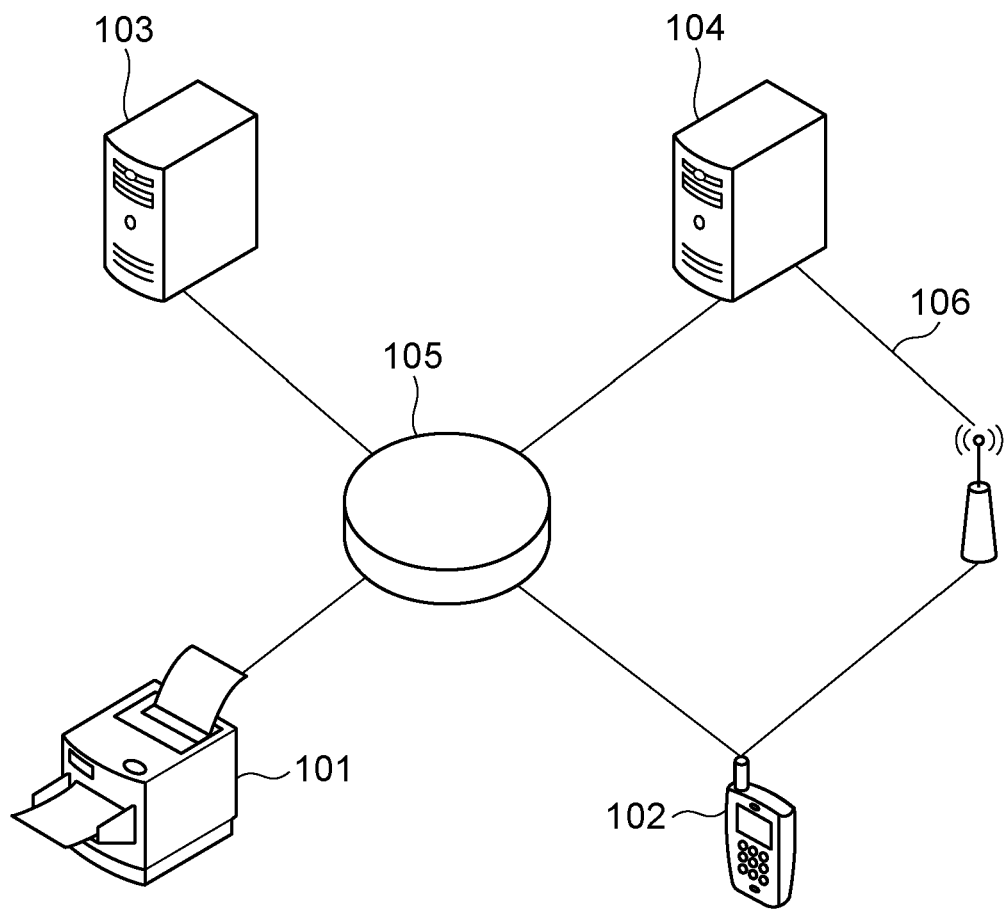
FIG. 1 is a system configuration diagram according to an embodiment of the present disclosure.

Embodiments of the present disclosure are described below with reference to the accompanying drawings. Note that an image forming apparatus according to the embodiments is an example of an image processing apparatus. Furthermore, the embodiments described below are in no way intended to limit the disclosure. All of the features and the combinations thereof described in the embodiments are not necessarily deemed to be essential.

First Embodiment

According to the present embodiment, the IP address of an image forming apparatus 101 is set to "192.168.1.101". The IP address of an information terminal 102 is set to "192.168.1.100". These IP addresses are only examples and may be different IP addresses. Note that a URL accessed by the image forming apparatus 101 and the information terminal 102 to use a service, such as an online storage, of a cloud server 103 via a network 105 is referred to as a "service URL". The service URL and "user name" and "password" that are authentication information corresponding to the service URL are registered in advance by using a service URL registration screen (not illustrated) and are stored in a storage 305 of the information terminal 102.

Overall Configuration

FIG. 1 illustrates an example of the system configuration according to the present embodiment. As illustrated in FIG. 1, an image processing system according to the present embodiment includes, for example, the image forming apparatus 101, the information terminal 102, the cloud server 103, an authentication server 104, the network 105, and a public line 106.

The image forming apparatus 101, the information terminal 102, the cloud server 103, and the authentication server 104 can communicate with one another via the network 105. In addition, the information terminal 102 and the authentication server 104 can communicate with each other via the public line 106. Note that instead of one image forming apparatus 101, a plurality of image forming apparatuses 101 may be connected to the network 105. In addition, a plurality of information terminals 102 may be connected.

The image forming apparatus 101 is a multi-function peripheral providing a plurality of functions, such as copying, scanning, printing, and faxing.

The information terminal 102 is, for example, a smartphone used by a user. The information terminal 102 may be a mobile phone or a tablet other than a smartphone. The information terminal 102 generates a scan job for scanning a paper medium document with the image forming apparatus 101 and a print job for printing an image file stored in the cloud server 103 with the image forming apparatus 101. In addition, the image forming apparatus 101 includes a unit for acquiring a one-time password from the authentication server 104 via the network 105.

The cloud server 103 consists of at least one cloud server. The cloud server 103 manages a service for performing file management regarding electronic files including image data and manages user information for accessing the electronic files. The cloud server 103 includes an authentication unit that authenticates, on the basis of authentication information notified via the network 105, the information terminal 102 or the image forming apparatus 101, which is a notification source, when the information terminal 102 or the image forming apparatus 101 accesses an electronic file.

The authentication server 104 has a function of decrypting the authentication information received from the cloud server 103. In addition, the authentication server 104 includes a unit that issues a one-time password, which is a password that can authenticate a user only within a predetermined time period, and sends the one-time password to a device registered in association with the user via SMS (Short Message Service) over the public line 106.

One of the units for sending a one-time password is a unit for sending, via the network 105, an e-mail including the one-time password. However, the present disclosure is not limited thereto, a unit can be used that sends, via the network 105, a one-time password to an application installed in the information terminal 102 to acquire authentication information.

Hardware Configuration of Image Forming Apparatus

Figure 2:
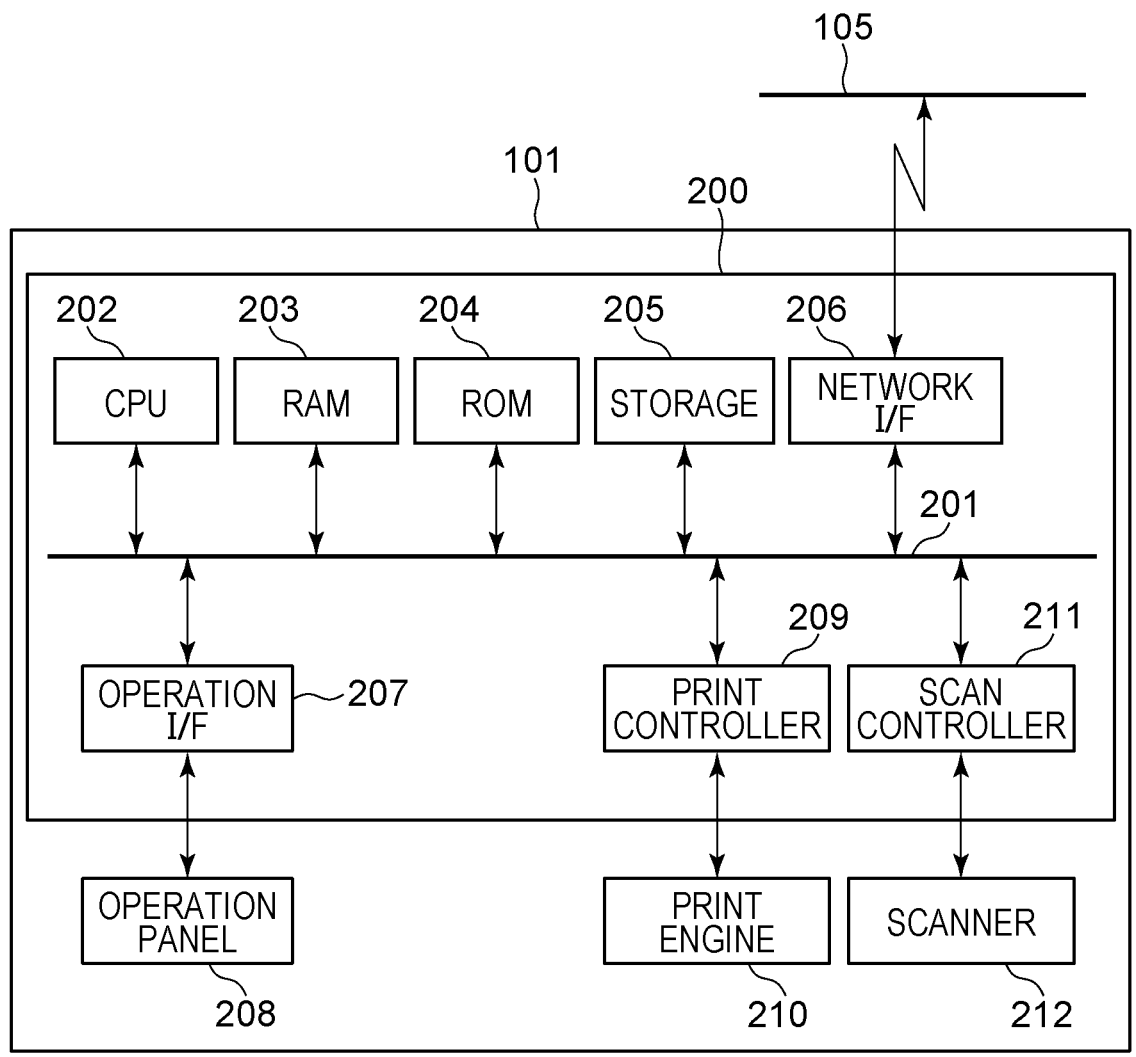
FIG. 2 is a block diagram of the configuration of an image forming apparatus according to the embodiment.

FIG. 2 is a block diagram schematically illustrating the configuration of the image forming apparatus 101 according to the embodiment of the present disclosure.

As illustrated in FIG. 2, the image forming apparatus 101 includes a central processing unit (CPU) 202, a random access memory (RAM) 203, a read only memory (ROM) 204, a storage 205, a network interface (I/F) 206, an operation I/F 207, a print controller 209, and a scan controller 211 each connected to a system bus 201.

The CPU 202 controls the overall operation performed by the image forming apparatus 101. The CPU 202 reads a control program stored in the ROM 204 or the storage 205 and performs various types of control, such as read control and print control.

The RAM 203 is the main memory of the CPU 202. The RAM 203 is used as a temporary storage area into which various control programs stored in the ROM 204 or the storage 205 is loaded.

The ROM 204 stores a program executable by the CPU 202.

The storage 205 is, for example, a hard disk drive (HDD). The storage 205 stores image data, various programs, and various types of setting information. Note that the storage 205 may be a solid state drive (SSD) or the like. Alternatively, the storage 205 may be replaced with another storage device having the same function as the HDD.

In the image forming apparatus 101 according to the present embodiment, a single CPU 202 executes each of processes illustrated in the flowcharts described below. However, other configurations may be used. For example, a plurality of CPUs, RAMs, ROMs, and storages may cooperate to execute each of the processes illustrated in the flowcharts described below. Furthermore, a hardware circuit, such as an application specific integrated circuit (ASIC) or a field-programmable gate array (FPGA) may be used to execute a subset of the processes.

The network I/F 206 is an interface for the image forming apparatus 101 to communicate with an external device via the network 105. The image forming apparatus 101 transmits, to the cloud server 103 or some server on the network 105 via the network I/F 206, image data generated by a scanner 212 reading an original document. In addition, the image forming apparatus 101 receives data managed by the cloud server 103 or some server on the network 105 via the network I/F 206 and prints the received data with a print engine 210.

An operation panel 208 includes, for example, a touch panel or hard keys. The operation panel 208 displays a screen controlled by the operation I/F 207, and when the user operates the operation panel 208, the image forming apparatus 101 acquires an event corresponding to a user operation via the operation I/F 207.

The print controller 209 is connected to the print engine 210. The image data to be printed is transferred to the print engine 210 via the print controller 209.

The print engine 210 receives a control command and image data to be printed and forms an image on a sheet on the basis of the image data. The print engine 210 may employ an electrophotographic technique or an inkjet technique. In the case of an electrophotographic technique, an electrostatic latent image is formed on a photoconductor and, thereafter, is developed with toner. The toner image is transferred to a sheet, and the transferred toner image is fixed to the sheet to form an image. In contrast, in the case of an inkjet technique, ink is ejected to a sheet to form an image.

The scan controller 211 is connected to the scanner 212. The scanner 212 reads the image of an original document and generates image data. The image data generated by the scanner 212 is stored in the storage 205. In addition, the image forming apparatus 101 can form an image on a sheet by using the print engine 210 on the basis of the image data generated by the scanner 212. The scanner 212 includes a document feeder (not illustrated) and can read original documents placed on the document feeder while conveying the original documents one by one.

Hardware Configuration of Information Terminal

Figure 3:
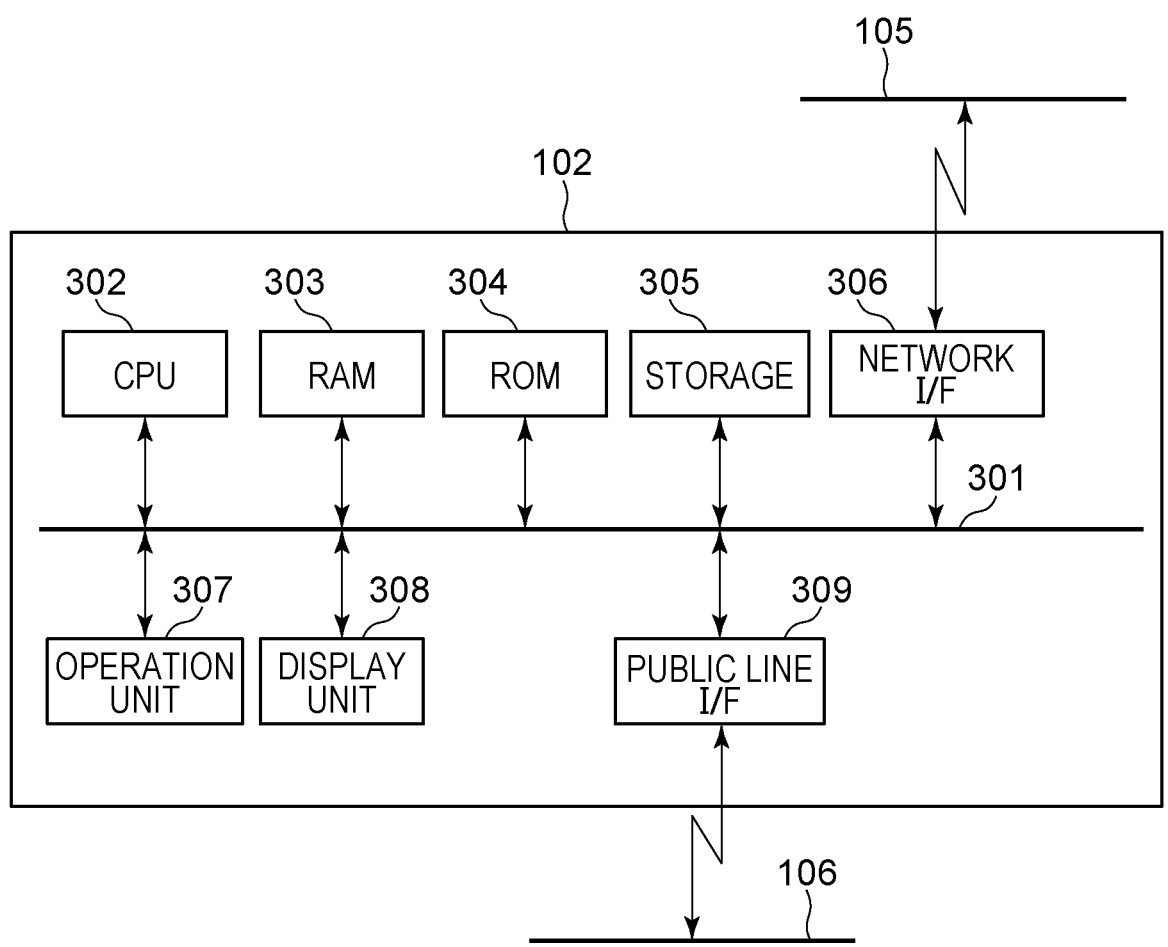
FIG. 3 is a block diagram of the configuration of an information terminal according to the embodiment.

FIG. 3 illustrates an example of the hardware configuration of the information terminal 102 according to an embodiment of the present disclosure.

As illustrated in FIG. 3, the information terminal 102 includes a CPU 302, a RAM 303, a ROM 304, a storage 305, a network I/F 306, an operation unit 307, a display unit 308, and a public line I/F 309 each connected to a system bus 301.

The CPU 302 is a central processing unit that controls the overall operation performed by the information terminal 102. The RAM 303 is a volatile memory and functions as a work area of the CPU 302. The ROM 304 is a nonvolatile memory and stores a boot program and a variety of programs. The storage 305 is a storage device (for example, a hard disk drive (HDD)) having a higher storage capacity than the RAM 303. The storage 305 may be a solid state drive (SSD) or the like. The storage 305 may be replaced with another storage device having the same function as the HDD.

The CPU 302 executes the boot program stored in the ROM 304 when the power is switched on or the like. The boot program is used to read the control program stored in the storage 305 and load the control program onto the RAM 303. After the CPU 302 executes the boot program, the CPU 302 executes the control program loaded onto the RAM 303 to perform control. In addition, the CPU 302 stores, in the RAM 303, data used when executing the control program and reads/writes the data. Furthermore, the storage 305 can store a variety of settings required when the control program is executed. The settings are read and written by the CPU 302. The information terminal 102 communicates with other devices on the network 105 via the network I/F 306. In addition, the information terminal 102 can receive the information indicated by the operation/input/instruction performed by the user through the operation unit 307. Furthermore, the information terminal 102 can display, on the display unit 308, the information controlled by the CPU 302. Still furthermore, the information terminal 102 communicates with other devices connected to the public line 106 via the public line I/F 309.

Hardware Configuration of Cloud Server

Figure 4:
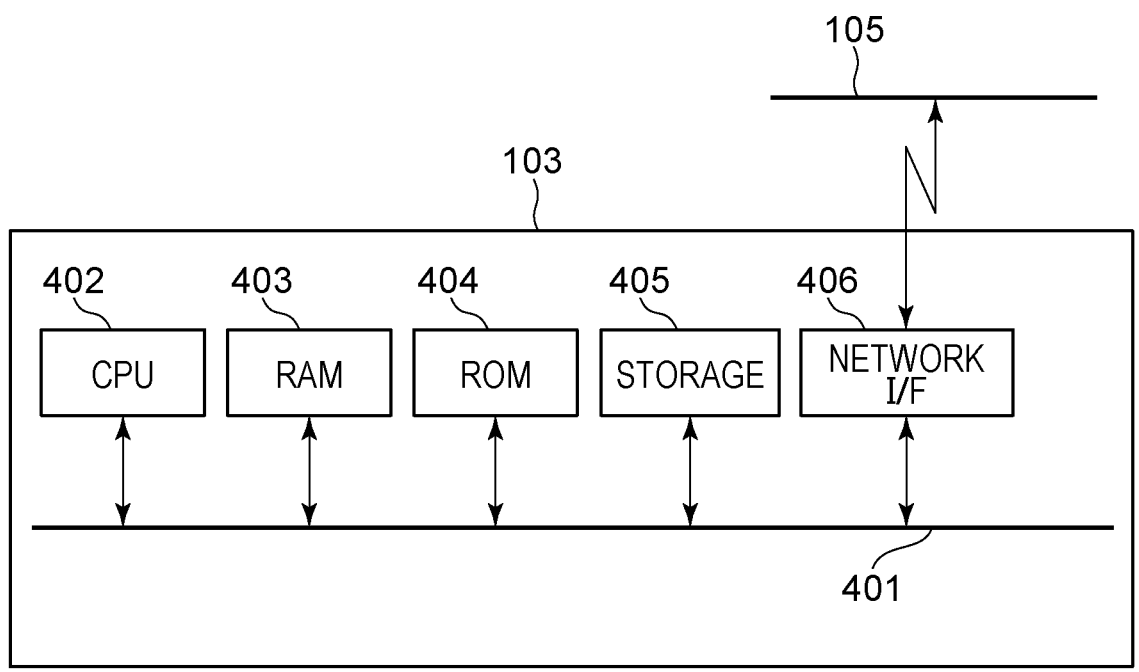
FIG. 4 is a block diagram of the configuration of a cloud server according to the embodiment.

FIG. 4 illustrates an example of the hardware configuration of the cloud server 103 according to the embodiment of the present disclosure.

As illustrated in FIG. 4, the cloud server 103 includes a CPU 402, a RAM 403, a ROM 404, a storage 405, and a network I/F 406 each connected to a system bus 401.

The CPU 402 is a central processing unit that controls the overall operation performed by the cloud server 103. The RAM 403 is a volatile memory and functions as a work area of the CPU 402. The ROM 404 is a nonvolatile memory and stores a boot program and a variety of programs. The storage 405 is a high-capacity storage device (for example, a hard disk drive (HDD)). Note that the storage 405 may be a solid state drive (SSD) or the like. The storage 405 may be replaced with another storage device having the same function as the hard disk drive.

The cloud server 103 communicates with other devices on the network 105 via the network I/F 406.

Hardware Configuration of Authentication Server

FIG. 5 illustrates an example of the hardware configuration of the authentication server 104 according to the embodiment of the present disclosure.

As illustrated in FIG. 5, the authentication server 104 includes a CPU 502, a RAM 503, a ROM 504, a storage 505, a network I/F 506, and a public line I/F 507 each connected to the system bus 501.

The CPU 502 is a central processing unit that controls the overall operation performed by the authentication server 104. The RAM 503 is a volatile memory and functions as a work area of the CPU 502. The ROM 504 is a nonvolatile memory and stores a boot program and a variety of programs. The storage 505 is a storage device (for example, a hard disk drive (HDD)) having a higher capacity than the RAM 503. Note that the storage 505 may be a solid state drive (SSD) or the like. The storage 505 may be replaced with another storage device having the same function as the hard disk drive.

Furthermore, the authentication server 104 communicates with other devices on the network 105 via the network I/F 506. Furthermore, the CPU 502 communicates with other devices on the public line 106 via the public line I/F 507.

User Information Registration Process

A user information registration process performed using the information terminal 102 is described below.

Figure 6A:
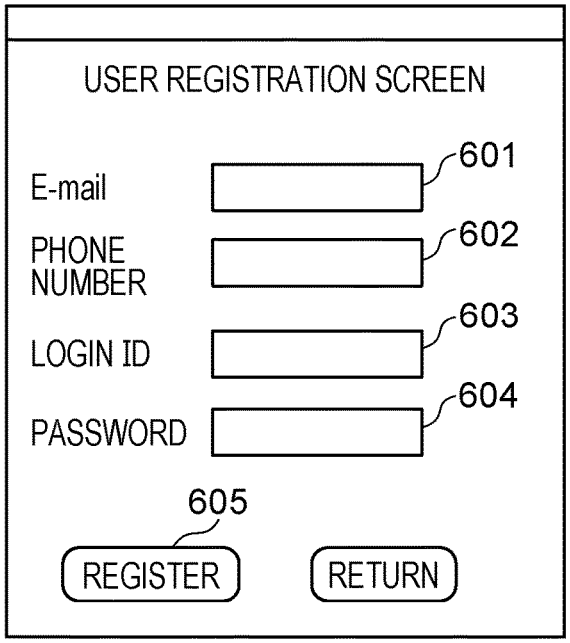
FIGS. 6A to 6D illustrate an example of screens according to the embodiment.
Figure 7A:
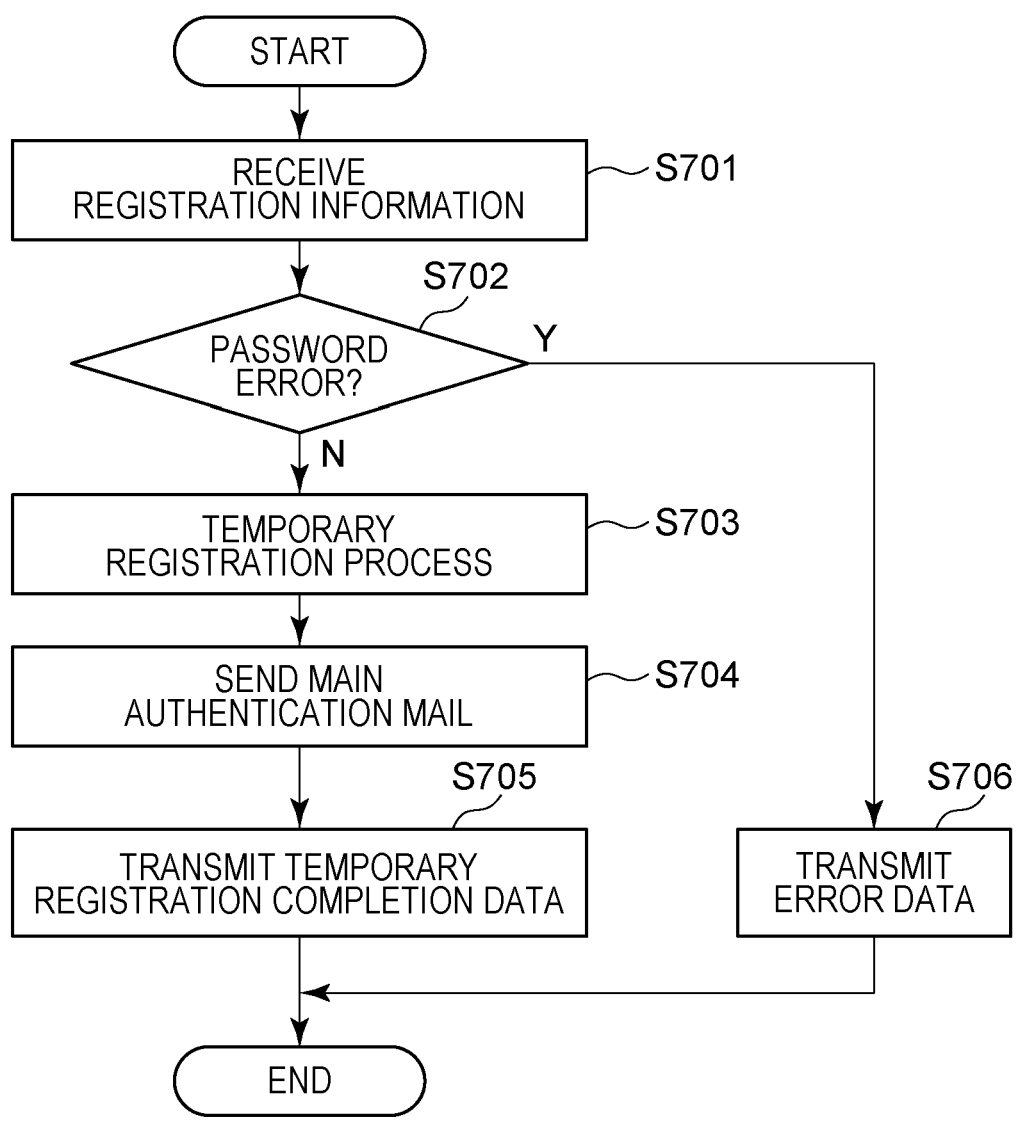
FIGS. 7A to 7C are flowcharts of a user information registration process according to the embodiment.
Figure 7B:
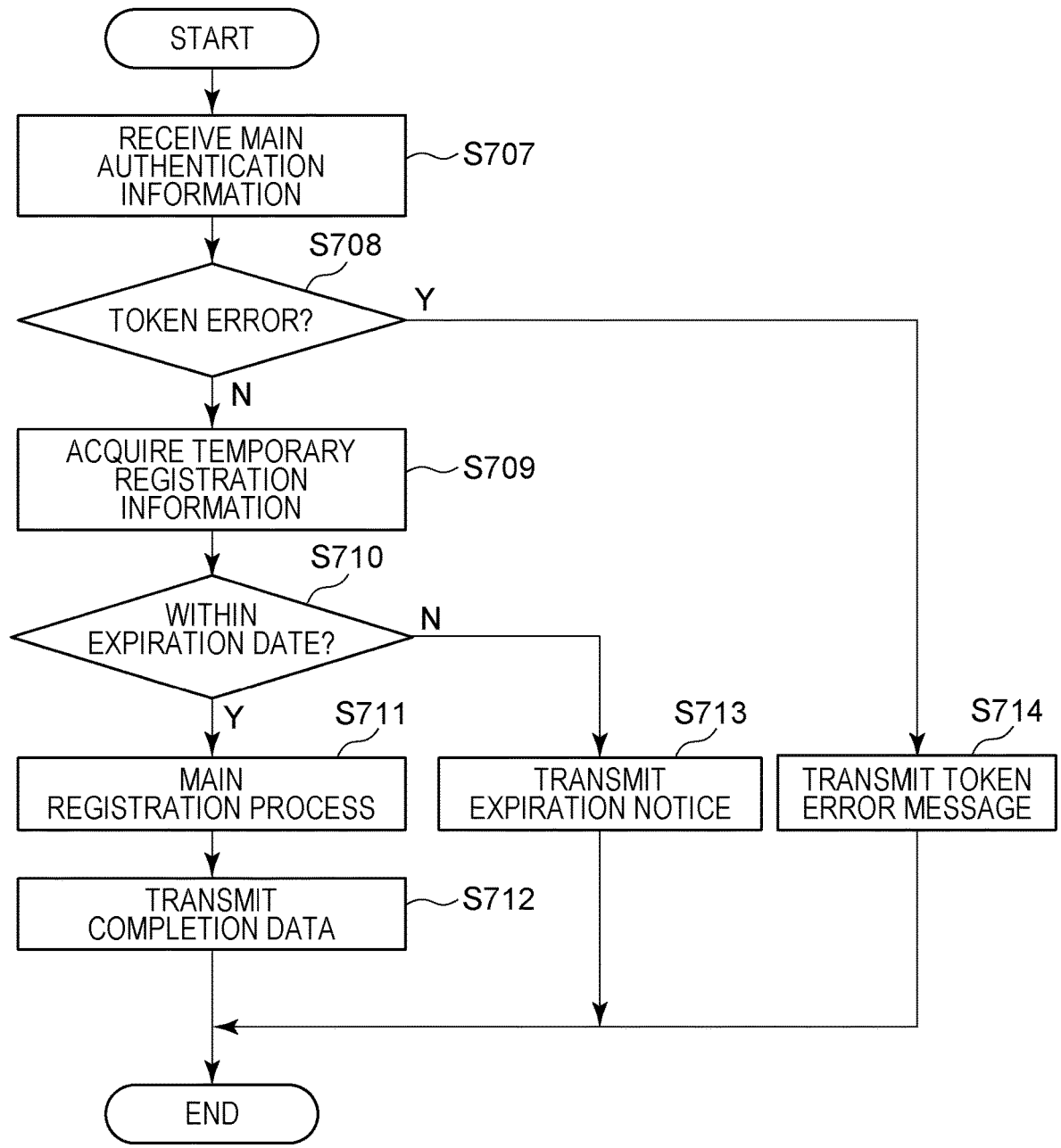
Figure 7C:
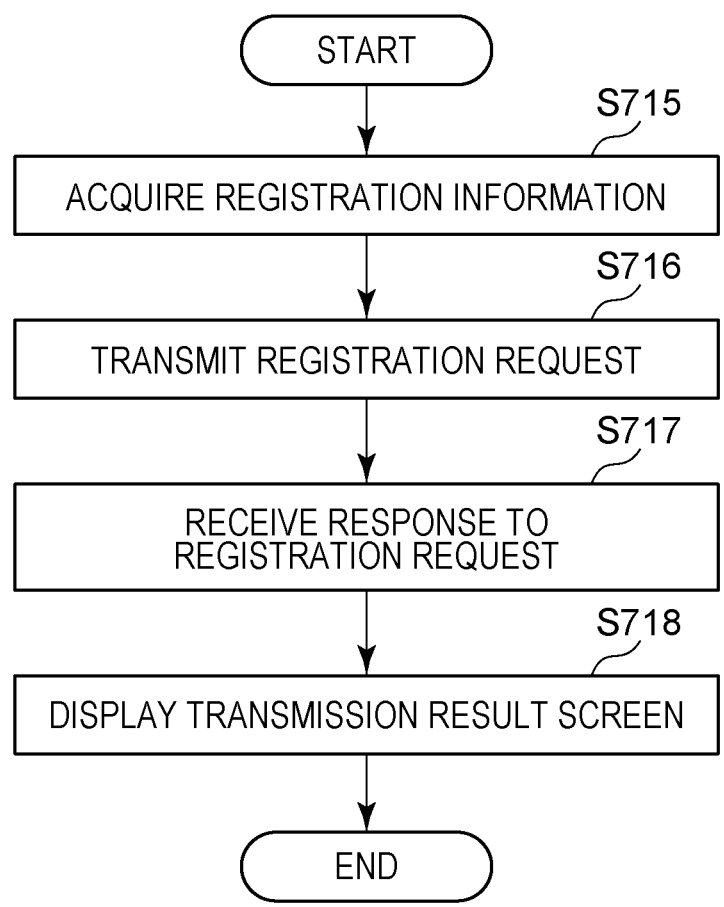

FIGS. 7A to 7C are flowcharts of the user information registration process performed by the authentication server 104 and the information terminal 102 according to the embodiment of the present disclosure. The processes of the flowcharts illustrated in FIGS. 7A and 7B are performed by the CPU 502 of the authentication server 104 loading the program stored in the ROM 504 onto the RAM 503 and executing the program. The processes of the flowchart illustrated in FIG. 7C are performed by the CPU 302 of the information terminal 102 loading the program stored in the ROM 304 onto the RAM 303 and executing the program. The information terminal 102 transmits a user registration screen acquisition request to the cloud server 103 in the form of an HTTP POST request on the basis of the operation performed on the Web browser by a user. Upon receiving the POST request, the cloud server 103 transmits, to the information terminal 102, HTTP response data having, attached thereto, the HTML data for displaying a user registration screen. The CPU 302 of the information terminal 102 causes the display unit 308 to display the user registration screen (FIG. 6A) on the basis of the received HTML data.

The user registration screen is displayed in a Web browser. The user fills an Email address text box 601, a phone number text box 602, a user ID text box 603, and a password text box 604. Thereafter, when the user presses a registration button 605, the CPU 302 of the information terminal 102 performs a user information transmission process (FIG. 7C). Then, the user inputs the phone number of the device owned by the user into the phone number text box 602. While the present embodiment is described with reference to the information terminal 102 as an example of a device owned by the user, the device owned by the user may be a device different from the information terminal 102.

In step 715 (hereinafter simply referred to as "S715"), the CPU 302 of the information terminal 102 stores, in the RAM 303, the Email address character string, which is a character string input to the Email address text box 601 of the user registration screen (FIG. 6A). In addition, the CPU 302 stores, in the RAM 303, the phone number character string input to the phone number text box 602. Furthermore, the CPU 302 stores, in the RAM 303, the user ID character string input to the user ID text box 603. Furthermore, the CPU 302 stores, in the RAM 303, the password character string input to the password text box 604. The CPU 302 stores, in the RAM 303, the above-described input information as registration information.

In S716, the CPU 302 of the information terminal 102 transmits, to the cloud server 103, a registration request having, attached thereto, the registration information in the RAM 303 in the form of an HTTP POST request.

In S717, the CPU 302 of the information terminal 102 receives HTTP response data as a response to the registration request and stores the received data in the RAM 303 as a registration request response.

In S718, the CPU 302 of the information terminal 102 causes the display unit 308 to display a transmission result screen on the basis of HTML data attached to the registration request response.

When the cloud server 103 redirects, to the authentication server 104, the HTTP request representing the registration request having, attached thereto, the registration information received in S715, the CPU 502 of the authentication server 104 performs a user information temporary registration process (FIG. 7A).

In S701, the CPU 502 of the authentication server 104 acquires the registration information from the HTTP request representing the registration request and stores the registration information in the RAM 503.

In S702, if the password character string in the registration information in the RAM 503 violates the password rule, the CPU 502 of the authentication server 104 determines that a password error occurs. An example of a password rule is that "the password must contain at least one alphanumeric character, at least one uppercase character, at least one lower case character, and at least one special symbol", and "the length is greater than or equal to 10".

However, if, in S702, the CPU 502 of the authentication server 104 determines that a password error does not occur, the CPU 502 of the authentication server 104 stores, in a temporary registration table in the storage 505 of the authentication server 104, the registration information and the expiration date in the RAM 503 in S703. An example of the expiration date is the time 10 minutes after the time when the process in S703 is performed.

In S704, the CPU 502 of the authentication server 104 generates a token character string by encrypting the user ID included in the registration information in the RAM 503. Thereafter, the CPU 502 of the authentication server 104 transmits, to the email address in the registration information, an email having body text including a main registration URL having the token character string attached thereto.

In S705, the CPU 502 of the authentication server 104 transmits, to the cloud server 103, HTTP response data having a temporary registration completion message attached thereto as a response to the registration request.

If, in S702, the CPU 502 of the authentication server 104 determines that a password error occurs, the CPU 502 of the authentication server 104 transmits, to the cloud server 103, the HTTP response data having the reason for the violation attached thereto as a response to the registration request in S706.

Upon receiving the temporary registration completion message in S705, the CPU 402 of the cloud server 103 transmits, to the information terminal 102, HTTP response data having, attached thereto, the HTML data for displaying a temporary registration completion screen (not illustrated) as a response to the registration request.

The user uses a Web browser of the information terminal 102 and accesses the main registration URL set forth in the text of Email received in S704. In this manner, when an HTTP request representing a main registration request is transmitted to the cloud server 103, the cloud server 103 redirects the HTTP request representing the main registration request to the authentication server 104. The CPU 502 of the authentication server 104 performs a main registration process (FIG. 7B).

In S707, the CPU 502 of the authentication server 104 stores the token character string attached to the main registration URL in the RAM 503.

In S708, the CPU 502 of the authentication server 104 decrypts the token character string in the RAM 503 to obtain the user ID. If the temporary registration table in the storage 505 does not contain the user ID, the CPU 502 of the authentication server 104 determines that a token error occurs.

If, in S708, the CPU 502 of the authentication server 104 determines that the token error does not occur, the CPU 502 of the authentication server 104 acquires, in S709, the temporary registration information from the temporary registration table in the storage 505 on the basis of the user ID obtained by decrypting the token character string and stores the temporary registration information in the RAM 503.

In S710, the CPU 502 of the authentication server 104 determines that the temporary registration information has expired if the expiration date of the temporary registration information in the RAM 503 is later than the time when S708 is performed. In addition, the CPU 502 of the authentication server 104 determines that the temporary registration information has expired if the temporary registration information associated with the user ID decrypted in S709 cannot be acquired.

If, in S710, the CPU 502 of the authentication server 104 determines that the expiration date has not expired, the CPU 502 of the authentication server 104 stores, in the registration information table in the storage 505, main registration information including the email address, phone number, user ID, and password included in the temporary registration information in the RAM 503 in S711.

In S712, the CPU 502 of the authentication server 104 transmits, to the cloud server 103, HTTP response data having a registration completion message attached thereto as a response to the main registration request.

If, in S708, the CPU 502 of the authentication server 104 determines that a token error occurs, the CPU 502 of the authentication server 104 transmits, in S714, HTTP response data having a token error message attached thereto to the cloud server 103 as a response to the main registration request.

If, in S710, the CPU 502 of the authentication server 104 determines that the temporary registration information has expired, the CPU 502 of the authentication server 104 transmits, in S713, the HTTP response data having an expiration notice attached thereto to the cloud server 103 as a response to the main registration request.

Service URL Registration

Figure 6B:
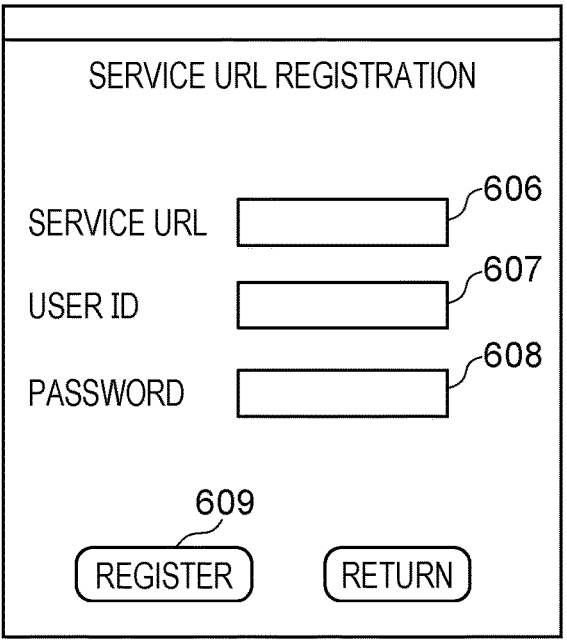
Figure 8B:
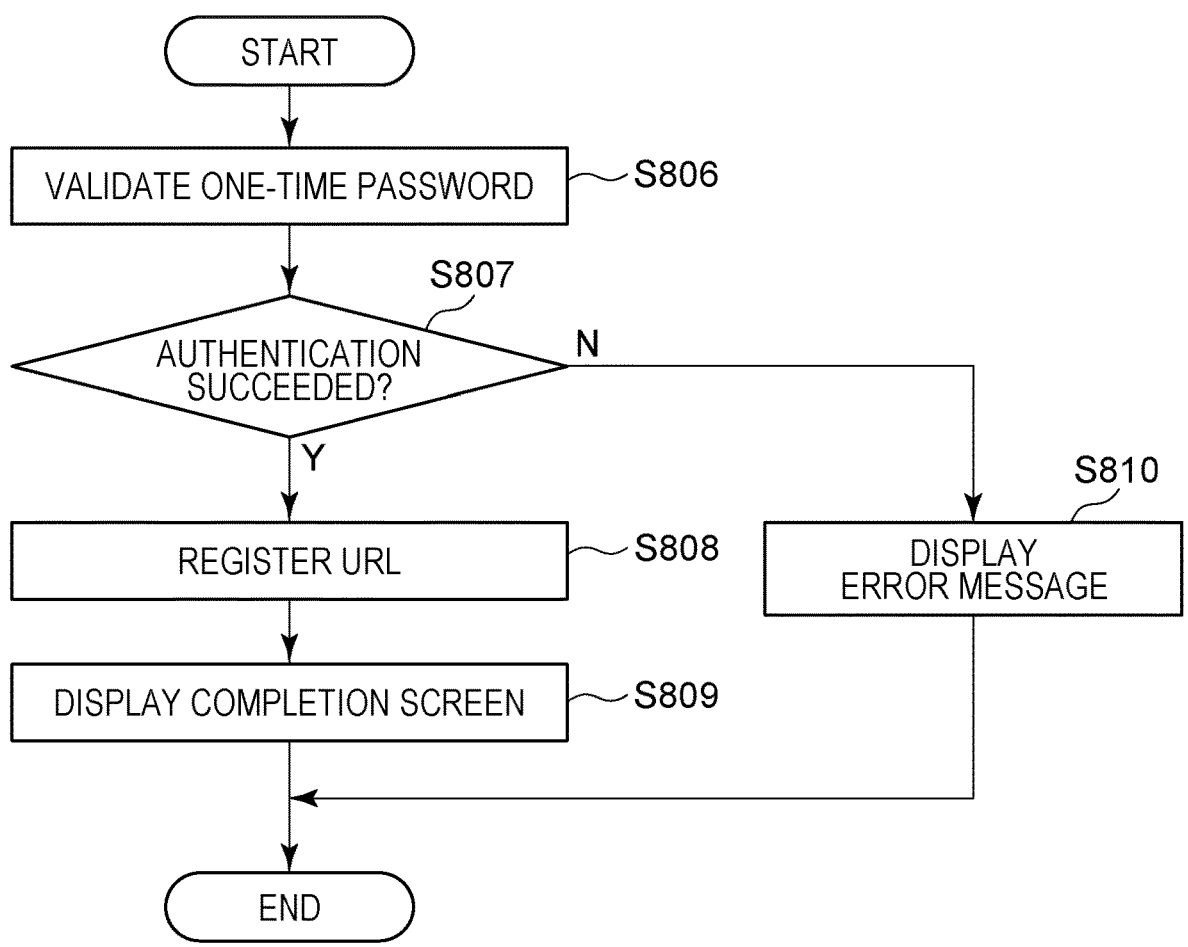

FIGS. 8A and 8B are flowcharts of service URL registration performed by the information terminal 102 according to the embodiment of the present disclosure. Each of the processes of the flowchart illustrated in FIGS. 8A and 8B is performed by the CPU 302 of the information terminal 102 loading the program stored in the ROM 304 onto the RAM 303 and executing the program. The user performs the user information registration process (FIGS. 7A to 7C) in advance corresponding to a service to be used to register the user ID and password. Thereafter, the user fills out the service URL text box 606, the user ID text box 607, and the password text box 608 in the service URL registration screen (FIG. 6B) of a scan application or a print application of the information terminal 102. Thereafter, when the user presses the registration button 609, the CPU 302 of the information terminal 102 performs a service URL temporary registration process (FIG. 8A).

In S800, the CPU 302 of the information terminal 102 stores, in the RAM 303, the registration information input into the user ID text box 607 and the password text box 608. Thereafter, the CPU 302 performs a process of transmitting, to a service URL corresponding to the service of the cloud server 103 input into the service URL text box 606, HTTP request data representing a registration information confirmation request and having the registration information attached thereto.

In S801, the CPU 302 of the information terminal 102 receives, from the cloud server 103, the registration information confirmation result in the form of an HTTP response.

In S802, if the registration information confirmation result received in S801 is "Yes", the CPU 302 of the information terminal 102 determines that there is the registration information.

If, in S802, the CPU 302 of the information terminal 102 determines that there is registration information, the CPU 302 of the information terminal 102 transmits, to the cloud server 103, HTTP request data representing a one-time password acquisition request having the user ID and password attached thereto in S803.

Figure 6C:
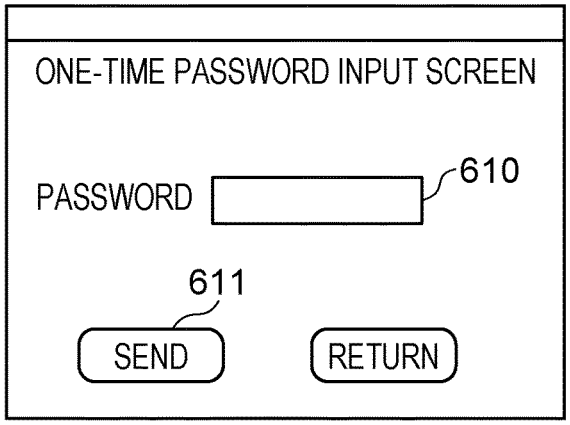

In S804, the CPU 302 of the information terminal 102 causes the display unit 308 of the information terminal 102 to display a one-time password input screen (FIG. 6C).

If, in S802, the CPU 302 of the information terminal 102 determines that there is no registration information, the CPU 302 of the information terminal 102 causes the display unit 308 to display a service URL registration screen with a message (not illustrated) that describes the cause of the error in S805.

After the CPU 302 of the information terminal 102 transmits a first authentication request in S803, the cloud server 103 redirects the HTTP request data representing the authentication request to the authentication server 104. Then, the authentication server 104 performs a first authentication process (FIG. 9A) to transmit a one-time password to the phone number of the information terminal 102 via SMS. The user inputs the one-time password in the SMS message received by the information terminal 102 into the one-time password text box 610 of the one-time password input screen (FIG. 6C). Subsequently, in response to the user pressing a send button 611, the CPU 302 of the information terminal 102 performs a service URL main registration process (FIG. 8B).

In S806, the CPU 302 of the information terminal 102 transmits, to the cloud server 103, HTTP request data representing a second authentication request and having, attached thereto, the one-time password input to the one-time password text box 610. Then, the CPU 302 of the information terminal 102 acquires a second authentication result in an HTTP response.

In S807, if the second authentication result acquired in S806 is successful, the CPU 302 of the information terminal 102 determines that the authentication is successful.

If, in S807, the CPU 302 of the information terminal 102 determines that the authentication is successful, the CPU 302 of the information terminal 102 stores, in the storage 305 of the information terminal 102, the registration information in the RAM 303 in S808.

In S809, the CPU 302 of the information terminal 102 causes the display unit 308 to display a registration completion screen (not illustrated).

However, if, in S807, the CPU 302 of the information terminal 102 determines that the authentication is not successful, the CPU 302 of the information terminal 102 causes, in S810, the display unit 308 to display a one-time password input screen with an error message (not illustrated) indicating the cause of the error.

Two-Factor Authentication Process

Figure 9A:
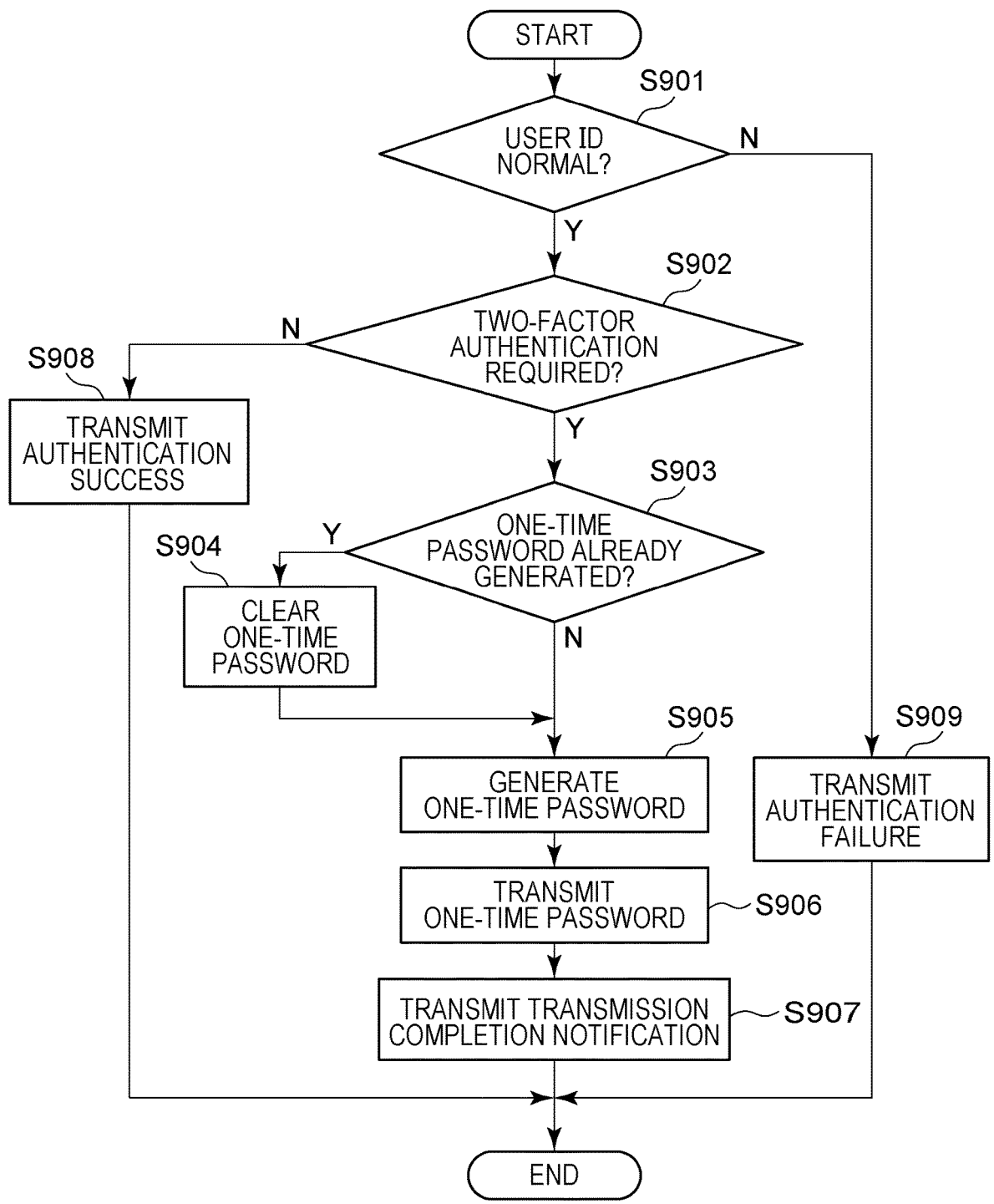
FIGS. 9A and 9B are flowcharts of a two-factor authentication process according to the embodiment.
Figure 9B:
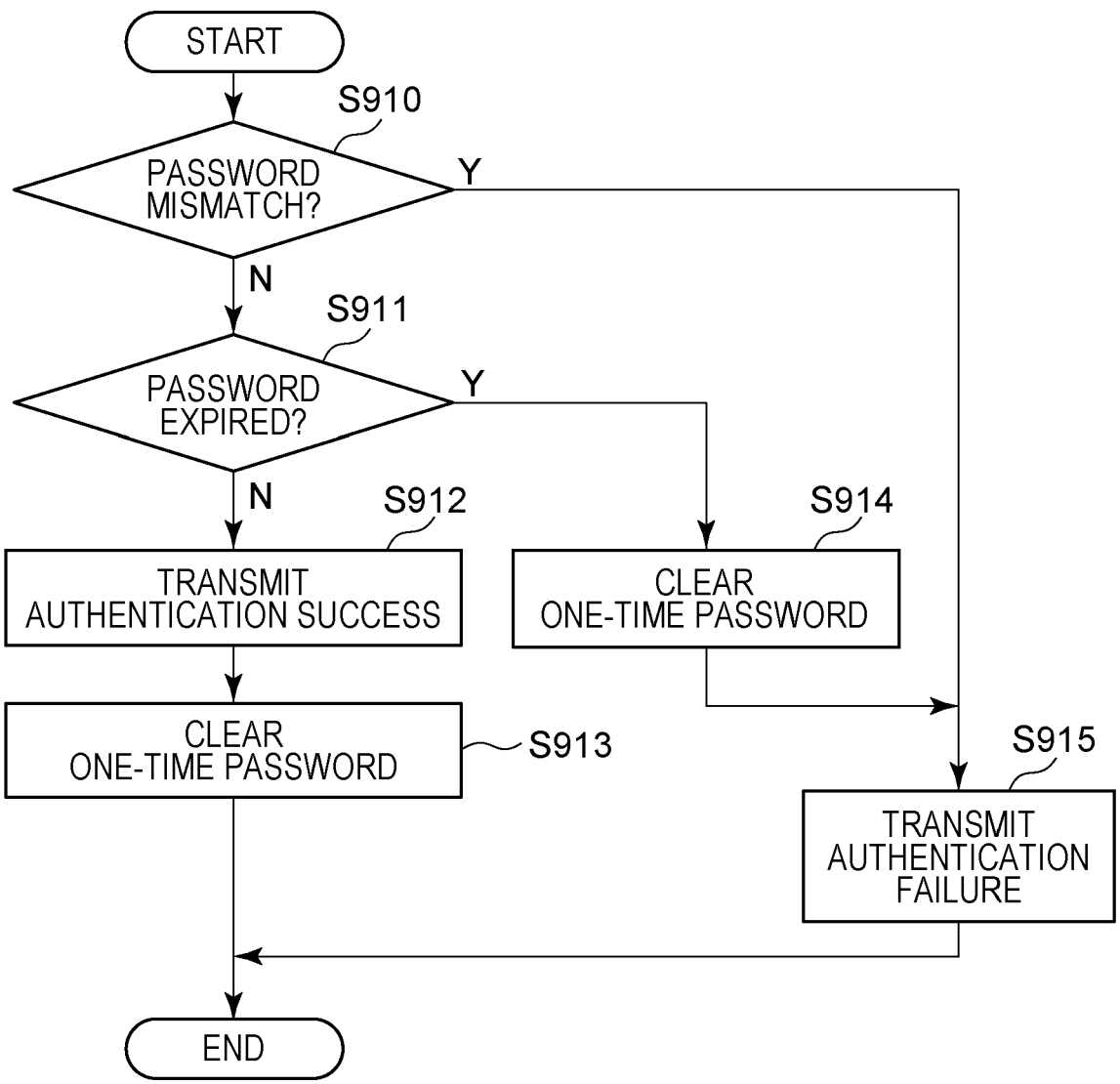

FIGS. 9A and 9B are flowcharts of the two-factor authentication process performed by the CPU 502 of the authentication server 104. Each of the processes of the flowchart illustrated in FIGS. 9A and 9B is performed by the CPU 502 of the authentication server 104 loading the program stored in the ROM 504 into the RAM 503 and executing the program.

Upon receiving the HTTP request data representing the first authentication request that is transmitted by the information terminal 102 requesting a one-time password (S803) in the service URL registration process (FIGS. 8A and 8B) and that is redirected by the cloud server 103, the CPU 502 performs the first authentication process (FIG. 9A). In addition, when the CPU 502 similarly receives HTTP request data in authentication information transmission (S1402) of a scan job flowchart (FIG. 14A) performed by a scan application, the CPU 502 performs the first authentication process (FIG. 9A). Furthermore, when the CPU 502 similarly receives HTTP request data in authentication information transmission (S1802) of the print job flowchart (FIG. 18A) performed by the print application, the CPU 502 performs the first authentication process (FIG. 9A).

In S901, the CPU 502 of the authentication server 104 determines that the user ID is normal if the user ID attached to the first authentication request is already in the registration information table in the storage 505.

Figure 6D:
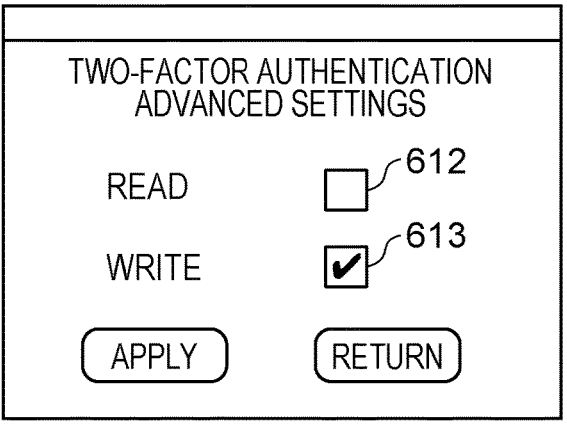

If, in S901, the CPU 502 of the authentication server 104 determines that the user ID is normal, the CPU 502 of the authentication server 104 determines whether two-factor authentication is needed in S902. The cloud server 103 can set the read permission for reading a file stored in the storage 505 and the write permission for writing a file to the storage 505 for each of users via a two-factor authentication setting screen (FIG. 6D). Thus, the CPU 502 of the authentication server 104 determines whether two-factor authentication is needed on the basis of the permission attached to the first authentication request and the permission granted to each user. For the user in the two-factor authentication setting (FIG. 6D), a read permission check box 612 is unchecked, and a write permission check box 613 is checked. Therefore, if write permission is attached to the first authentication request, the CPU 502 of the authentication server 104 determines that two-factor authentication is needed, and if read permission is attached to the first authentication request, the CPU 502 of the authentication server 104 determines that two-factor authentication is not needed.

If, in S902, the CPU 502 of the authentication server 104 determines that two-factor authentication is needed and if, in S903, the user ID attached to the first authentication request is already in a one-time password management table, the CPU 502 of the authentication server 104 determines that a one-time password has already been generated.

If, in S903, the CPU 502 of the authentication server 104 determines that the one-time password has already been generated, the CPU 502 of the authentication server 104 deletes, in S904, the one-time password information corresponding to the user ID attached to the first authentication request from the one-time password management table.

However, if, in S903, the CPU 502 of the authentication server 104 determines that the one-time password has not been generated or after the CPU 502 performs S904, the CPU 502 of the authentication server 104 generates a one-time password, which is a random 4-digit number, in S905. Thereafter, the CPU 502 stores, in the one-time password management table in the storage 505, the one-time password information consisting of the user ID attached to the first authentication request, the generated one-time password, and the one-time password expiration date. An example of the one-time password expiration date is the time 10 minutes after the time when S905 is performed.

In S906, the CPU 502 of the authentication server 104 acquires, from the registration information table, the phone number associated with the user ID attached to the first authentication request, and transmits the one-time password generated in S905 via SMS.

In S907, the CPU 502 of the authentication server 104 transmits, to the cloud server 103, HTTP response data having a successful transmission message attached thereto as a response to the first authentication request.

If, in step S902, the CPU 502 of the authentication server 104 determined that two-factor authentication is not needed, the CPU 502 of the authentication server 104 transmits the HTTP response data in S908. At this time, the authentication result "authentication success" and authentication information, which is information used by the image forming apparatus 101 to access the cloud server 103, are attached to the HTTP response data, and the HTTP response data is transmitted as a response to the first authentication request.

If, in S901, the CPU 502 of the authentication server 104 determines that the user ID is not normal, the CPU 502 of the authentication server 104 transmits, to the cloud server 103, the HTTP response data having an authentication failure message attached thereto as the response to the first authentication request in S909.

After the one-time password is transmitted in S906, the user inputs the one-time password received via SMS using the operation unit 307 of the information terminal 102. Thereafter, the information terminal 102 transmits, to the cloud server 103, HTTP request data representing the second authentication request and having the user ID and the one-time password attached thereto. The authentication server 104 receives the HTTP request data representing the second authentication request that is transmitted by the information terminal 102 in the one-time password transmission (S1409) in the scan job flowchart performed by the scan application (FIGS. 14A to 14C) and that is redirected by the cloud server 103. Upon receiving the HTTP request data, the CPU 502 of the authentication server 104 performs a second authentication process (FIG. 9B). In addition, when the authentication server 104 similarly receives the HTTP request data in one-time password transmission (S1810) of a print job flowchart (FIGS. 18A to 18C) performed by the print application, the CPU 502 of the authentication server 104 performs the second authentication process (FIG. 9B).

If, in S910, the user ID and the one-time password attached to the second authentication request are not in the one-time password management table, the CPU 502 of the authentication server 104 determines that password mismatch occurs.

However, if, in S910, the CPU 502 of the authentication server 104 determines that password mismatch does not occur, the processing of the CPU 502 of the authentication server 104 proceeds to S911. In S911, the CPU 502 of the authentication server 104 determines that the password information has expired if the expiration date of the one-time password information corresponding to the user ID and the one-time password attached to the second authentication request is earlier than the time when S910 is performed.

However, if, in S911, the CPU 502 of the authentication server 104 determines that the password information has not expired, the processing of the CPU 502 proceeds to S912, where the CPU 502 of the authentication server 104 transmits HTTP response data to the cloud server 103 as a response to the second authentication request. At this time, an authentication result "authentication success" and authentication information, which is information used by the image forming apparatus 101 to access the cloud server 103, are attached to the HTTP response data, and the HTTP response data is transmitted.

In S913, the CPU 502 of the authentication server 104 deletes, from the one-time password management table, the one-time password information corresponding to the user ID attached to the second authentication request.

If, in S911, the CPU 502 of the authentication server 104 determines that the password information has expired, the CPU 502 of the authentication server 104 deletes, from the one-time password management table, the one-time password information corresponding to the user ID attached to the second authentication request in S914.

If, in S910, the CPU 502 of the authentication server 104 determines that password mismatch occurs or after S914 is performed, the CPU 502 of the authentication server 104 transmits, to the cloud server 103, HTTP response data having an authentication failure message attached thereto as a response to the second authentication request in S915.

Scan Application UI Flow

Figure 10:
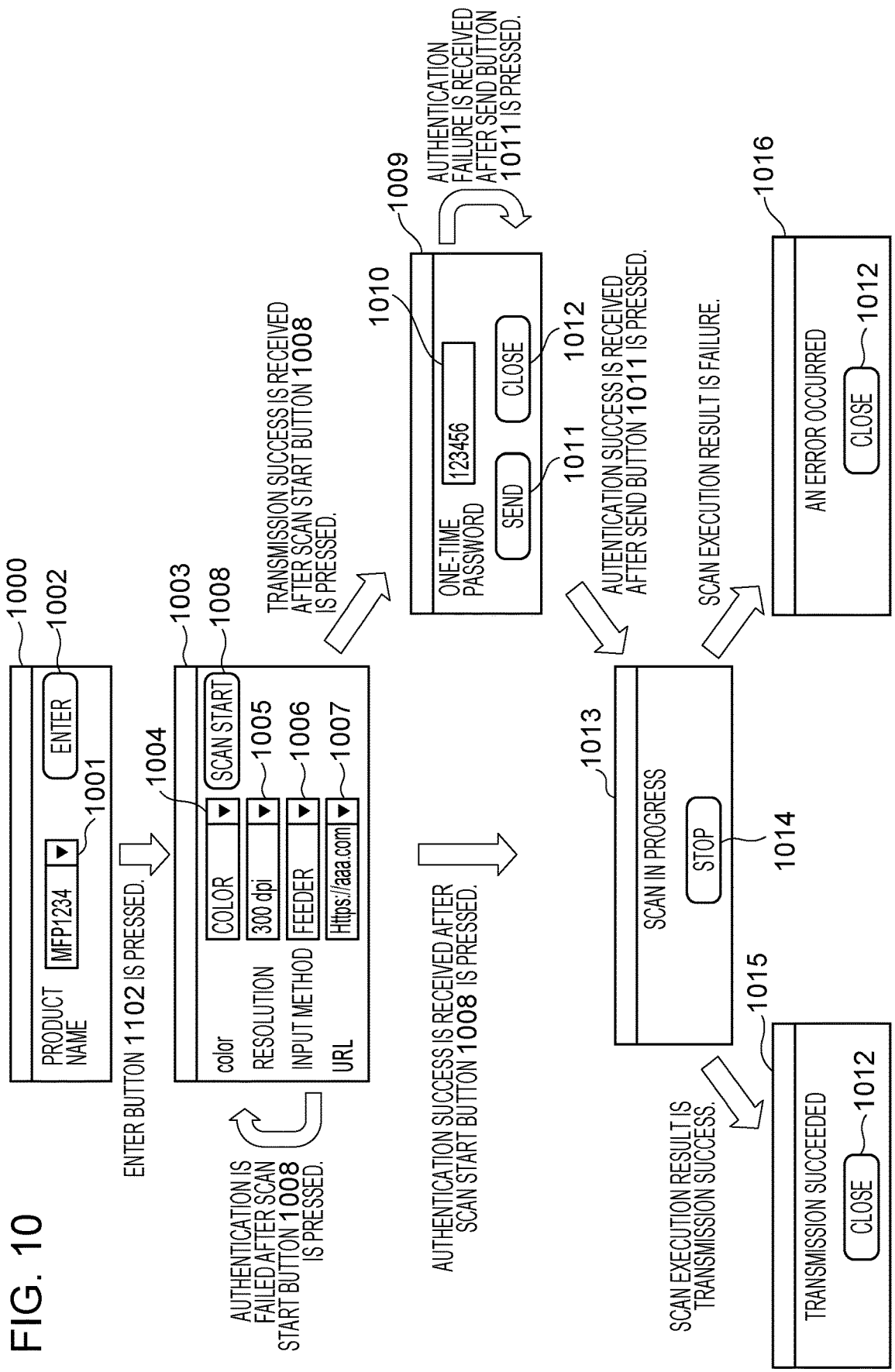
FIG. 10 illustrates a screen flow of a scan application according to the embodiment.

FIG. 10 illustrates a screen flow of a scan application displayed on the information terminal 102 according to the present embodiment. The scan application is an application for performing a scan operation.

When the user activates the scan application via the information terminal 102, the CPU 302 of the information terminal 102 causes the display unit 308 to display a device selection screen 1000.

The device selection screen 1000 has a product name designation list box 1001 and an ENTER button 1002 arranged therein. The product name designation list box 1001 is used to select an image forming apparatus 101 that performs scanning.

When the ENTER button 1002 is pressed, the CPU 302 of the information terminal 102 stores, in the RAM 303, the information about the image forming apparatus 101 selected via the product name designation list box 1001, generates a scan setting screen 1003, and causes the display unit 308 to display the scan setting screen 1003.

The scan setting screen 1003 has a color mode designation list box 1004, a resolution designation list box 1005, an input method designation list box 1006, a service URL designation list box 1007, and a scan start button 1008 arranged therein. The color mode designation list box 1004 is used to designate a color mode at the time of scanning. In addition, the resolution designation list box 1005 is used to designate the scan resolution of the image to be scanned. Furthermore, the input method designation list box 1006 is used to designate one of "pressing plate" and "ADF" which indicates the image reading method. The service URL designation list box 1007 is used to designate the service URL of the registration information stored in the storage 305. An example of the service URL is a URL of a cloud storage, such as Google Drive™ "https://cloud.Google-.com". Furthermore, another example of the service URL is a URL of a cloud storage, such as OneDrive™ "https://www.microsoft.com/onedrive".

When the scan start button 1008 is pressed, the CPU 302 of the information terminal 102 stores, in the RAM 303, the scan settings designated via the color mode designation list box 1004 to the service URL designation list box 1007. Thereafter, the CPU 302 attaches, to HTTP request data representing the first authentication request, the user ID and password in the registration information corresponding to the selected service URL and a write permission request for requesting the cloud server to allow writing. Then, the CPU 302 transmits the HTTP request data to the service URL.

If the CPU 302 of the information terminal 102 receives HTTP response data indicating an authentication failure in response to the first authentication request, the CPU 302 of the information terminal 102 causes the display unit 308 to display the scan setting screen 1003 in which the error message is disposed on the basis of the received details of the error.

However, if the CPU 302 of the information terminal 102 receives the HTTP response data indicating successful transmission in response to the HTTP request data representing the first authentication request, the CPU 302 of the information terminal 102 causes the display unit 308 to display a one-time password input screen 1009.

The one-time password input screen 1009 has a one-time password input text box 1010, a send button 1011, and a close button 1012 arranged therein. When the user inputs the one-time password into the one-time password input text box and presses the send button 1011, the CPU 302 of the information terminal 102 transmits HTTP request data representing the second authentication request having the input one-time password attached thereto.

If the CPU 302 of the information terminal 102 receives HTTP response data indicating an authentication failure in response to the second authentication request, the CPU 302 of the information terminal 102 causes the display unit 308 to display the one-time password input screen 1009 in which an error message is disposed on the basis of the received details of the error.

However, if the CPU 302 of the information terminal 102 receives HTTP response data indicating successful authentication in response to the first authentication request or if the CPU 302 of the information terminal 102 receives HTTP response data indicating successful authentication in response to the second authentication request, the CPU 302 of the information terminal 102 transmits a scan job ticket to the image forming apparatus 101. Furthermore, the CPU 302 causes the display unit 308 to display a scan in progress screen 1013. The image forming apparatus 101 receives the scan job ticket and executes the scan job. More specifically, the scan job includes the scan settings set via the scan setting screen 1003, and the CPU 202 causes the scanner 212 to scan an original document on the basis of the scan settings. The image data generated by scanning the original document is stored in the storage 205 and is transmitted to the cloud server 103.

The scan in progress screen 1013 has a scan stop button 1014 arranged therein. When the user presses the scan stop button 1014, the CPU 302 of the information terminal 102 transmits a job cancellation command to the image forming apparatus 101. While the scan in progress screen 1013 is being displayed, the CPU 302 of the information terminal 102 acquires the status of the image forming apparatus 101 at 100-msec intervals. If the acquired scan result is "success", the CPU 302 of the information terminal 102 causes the display unit 308 to display a transmission success screen 1015. However, if the acquired scan result is "failure", the CPU 302 of the information terminal 102 causes the display unit 308 to display an error screen 1016.

The transmission success screen 1015 has the close button 1012 therein, and when the user presses the close button 1012, the CPU 302 of the information terminal 102 terminates the scan application.

The error screen 1016 has the close button 1012 therein, and when the user presses the close button 1012, the CPU 302 of the information terminal 102 terminates the scan application.

Print Application UI Flow

Figure 11:
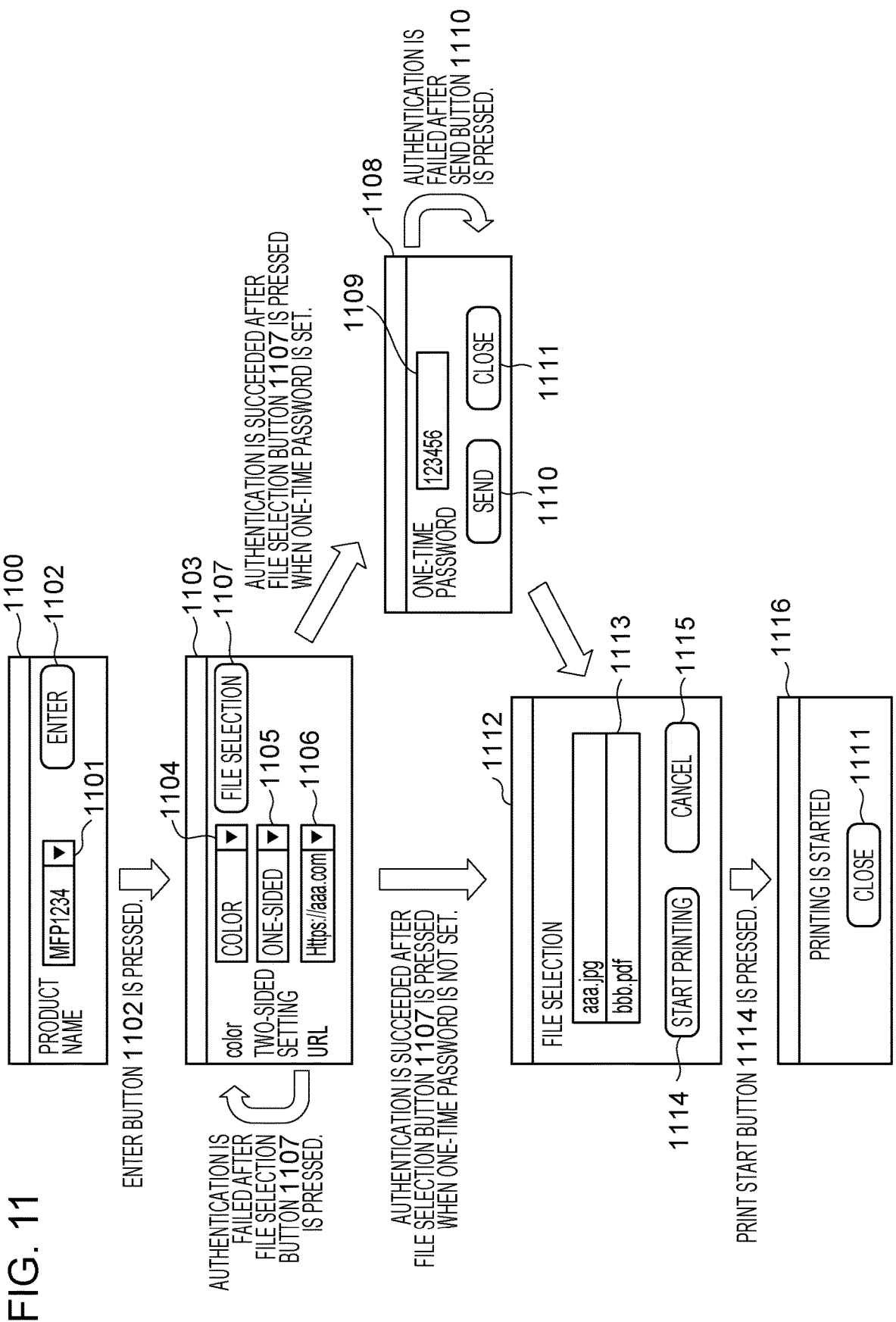
FIG. 11 illustrates a screen flow of a print application according to the embodiment.

FIG. 11 illustrates the print application screen flow displayed on the information terminal 102 according to the first embodiment. The print application is an application for performing a print operation.

When the user activates the print application via the information terminal 102, the CPU 302 of the information terminal 102 causes the display unit 308 to display a device selection screen 1100.

The device selection screen 1100 has a product name designation list box 1101 and an ENTER button 1102 arranged therein. The product name designation list box 1101 is used to designate an image forming apparatus 101 to perform printing.

When the ENTER button 1102 is pressed, the CPU 302 of the information terminal 102 stores, in the RAM 303, the information about the image forming apparatus 101 designated via the product name designation list box 1101, generates a print setting screen 1103, and causes the display unit 308 to display the print setting screen 1103.

The print setting screen 1103 has a color mode designation list box 1104, a two-sided designation list box 1105, a service URL designation list box 1106, and a file selection button 1107 arranged therein. The color mode designation list box 1104 is used to designate a color mode when printing is performed. The two-sided designation list box 1105 is used to designate one of the settings of "one-sided printing" and "two-sided printing". The service URL designation list box 1106 is used to designate the service URL of the registration information stored in the storage 305. An example of the service URL is a cloud storage URL, such as Google Drive™ "https://cloud.google.com". Another example of the service URL is a cloud storage URL, such as OneDrive™ "https://www.microsoft.com/onedrive".

When the file selection button 1107 is pressed, the CPU 302 of the information terminal 102 stores, in the RAM 303, the print settings designated via the color mode designation list box 1104 to the service URL designation list box 1106. Then, the CPU 302 attaches, to HTTP request data representing the first authentication request, the user ID and password in the registration information corresponding to the selected service URL and a read permission request for requesting a read operation on the cloud server and transmits the HTTP request data to the service URL.

If the CPU 302 of the information terminal 102 receives HTTP response data indicating an authentication failure in response to the first authentication request, the CPU 302 of the information terminal 102 causes the display unit 308 to display the print setting screen 1103 in which the error message is disposed on the basis of the received details of the error.

However, if the CPU 302 of the information terminal 102 receives the HTTP response data indicating successful transmission in response to the HTTP request data indicating the first authentication request, the CPU 302 of the information terminal 102 causes the display unit 308 to display a one-time password input screen 1108.

The one-time password input screen 1108 has a one-time password input text box 1109, a send button 1110, and a close button 1111 arranged therein. When the user inputs the one-time password into the one-time password input text box and presses the send button 1110, the CPU 302 of the information terminal 102 transmits the HTTP request data to the cloud server 103. The input one-time password is attached to the HTTP request data, and the HTTP request data is transmitted.

If the CPU 302 of the information terminal 102 receives the HTTP response data indicating the authentication failure in response to the second authentication request, the CPU 302 of the information terminal 102 causes the display unit 308 to display the one-time password input screen 1108 in which an error message is disposed on the basis of the received details of the error.

However, if the CPU 302 of the information terminal 102 receives the HTTP response data indicating successful authentication in response to the first authentication request or if the CPU 302 of the information terminal 102 receives the HTTP response data indicating successful authentication in response to the second authentication request, the CPU 302 causes the display unit 308 to display a file selection screen 1112.

The file selection screen 1112 includes a file list 1113, a print start button 1114, and a cancel button 1115 arranged therein. The file list 1113 displays a list of files stored at the service URL. The user can select one or more files in the file list 1113 using the operation unit 307. When the user selects at least one file and presses the print start button 1114 button, the CPU 302 of the information terminal 102 transmits a print job ticket to the image forming apparatus 101. In addition, the CPU 302 causes the display unit 308 to display a print start screen 1116. If the user presses the close button 1111, the CPU 302 of the information terminal 102 terminates the print application. Upon receiving the print job ticket, the image forming apparatus 101 executes the print job in accordance with the received print job ticket. More specifically, the CPU 202 performs a reception process to receive the selected file from the cloud server 103 indicated by the URL designated via the service URL designation list box 1106. Thereafter, the CPU 202 causes the print engine 210 to print the selected file on the basis of the print settings set via the color mode designation list box 1104 and the two-sided designation list box 1105 of the print setting screen 1103.

The print start screen 1116 has a close button 1111 disposed therein, and when the user presses the close button 1111, the CPU 302 of the information terminal 102 terminates the print application.

Scan Sequence

Figure 12:
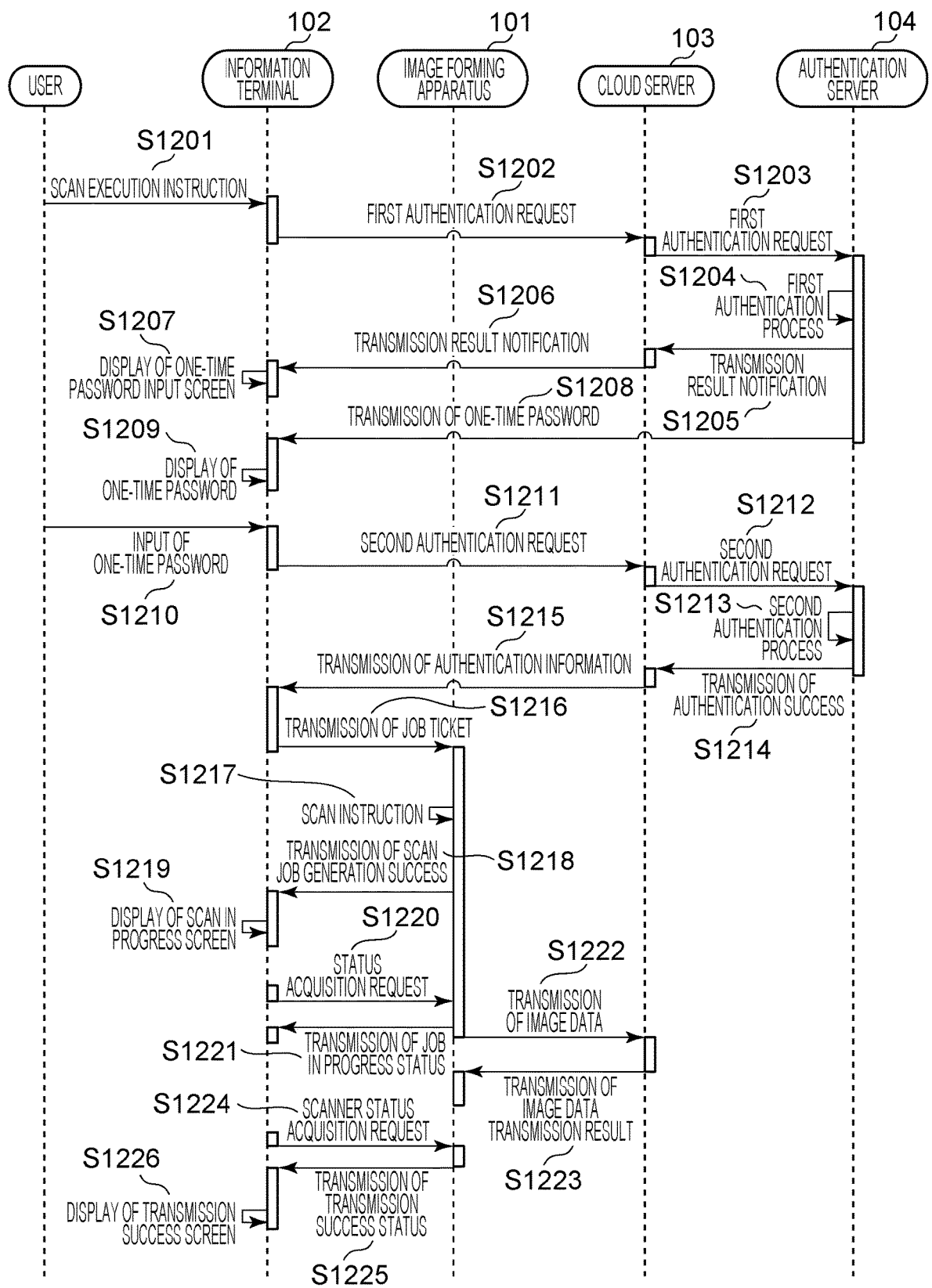
FIG. 12 is a sequence diagram illustrating first scan control according to the embodiment.

FIG. 12 is a sequence diagram illustrating an example of a technique to perform authentication against the cloud server 103 using two-factor authentication and execute a scan job for transmitting an image to the cloud server 103, according to the first embodiment of the present disclosure. Each of processes of the flowchart illustrated in FIG. 12 is performed by the CPU 402 of the cloud server 103 loading a program stored in the ROM 404 into the RAM 403 and executing the program. According to the present embodiment, a scan job execution technique is described in settings where the cloud server 103 requires two-factor authentication for write permission, and the two-factor authentication is performed via the information terminal 102 before the scan job is executed. In addition, according to the present embodiment, the information terminal 102, the image forming apparatus 101, the cloud server 103, and the authentication server 104 use HTTP for communication. Furthermore, when the one-time password is transmitted from the authentication server 104 to the information terminal 102, SMS is used over a public line, and the information terminal 102 and the cloud server 103 perform primary authentication by basic authentication.

In S1201, the user uses a scan application on the information terminal 102 to designate a device via the device selection screen 1000 and perform scan job setting via the scan setting screen 1003. Thereafter, the user presses the scan start button 1008 in the scan setting screen 1003.

In S1202, the CPU 202 of the information terminal 102 transmits the first authentication request to the cloud server 103 corresponding to the service URL "https://aaa.com/Storage1" set in S1201. At this time, the user ID "user1" and the password "password1" that are stored in the storage 305 and that correspond to the service URL are attached to the first authentication request, and the first authentication request is transmitted.

In S1203, the CPU 402 of the cloud server 103 redirects the HTTP POST request received in S1202 to the authentication server 104.

In S1204, the CPU 502 of the authentication server 104 performs the first authentication process (FIG. 9A).

In S1205, the CPU 502 of the authentication server 104 transmits, to the cloud server 103, the HTTP response status code "200" as the response to the first authentication request and HTTP response data indicating "transmission result notification" as the detailed status.

In S1206, the CPU 402 of the cloud server 103 redirects the HTTP response data received in S1205 to the information terminal 102.

In S1207, the CPU 302 of the information terminal 102 causes the display unit 308 to display the one-time password input screen 1009.

In S1208, the CPU 502 of the authentication server 104 transmits the one-time password "1111" generated in the first authentication process to the information terminal 102 by SMS over the public line 106.

While the above description has been made with reference to the information terminal 102 as an example of the transmission destination of the one-time password "1111", the one-time password "1111" may be transmitted using SMS to another device registered in association with the user.

In S1209, the CPU 302 of the information terminal 102 causes the display unit 308 to display the one-time password "1111" received in S1207 via an SMS application (not illustrated).

In S1210, the user uses the operation unit 307 of the information terminal 102 and inputs, to the one-time password input screen 1009, the one-time password "1111" obtained in S1209. Thereafter, the user presses the send button 1011.

In S1211, the CPU 302 of the information terminal 102 transmits, to the cloud server 103, a second authentication request having, attached thereto, the one-time password "1111" input in S1210 by an HTTP POST request. Note that when the one-time password "1111" is transmitted to another device, the term "information terminal 102" in S1210 and S1211 is replaced with the product name of the device.

In S1212, the CPU 402 of the cloud server 103 redirects the HTTP POST request received in S1211 to the authentication server 104.

In S1213, the CPU 502 of the authentication server 104 executes the second authentication process (FIG. 9B).

In S1214, the CPU 502 of the authentication server 104 transmits HTTP response data to the cloud server 103. At this time, the HTTP response status code "200" is attached to the HTTP response data as the response to the second authentication request, and the authentication information "dXNlcjE6cGFzc3dvcmQx" is attached to the HTTP response data as the detailed status. Thereafter, the HTTP response data is transmitted.

In S1215, the CPU 402 of the cloud server 103 redirects the HTTP response data received in S1214 to the information terminal 102.

In S1216, the CPU 302 of the information terminal 102 generates a job command. The job command is generated on the basis of the scan job settings set in S1201, the service URL "https://aaa.com/Storage1", and the authentication information "dXNlcjE6cGFzc3dvcmQx" received in S1215. Then, the CPU 302 transmits a scan job ticket (FIG. 13) to the image forming apparatus 101 designated in S1201.

In S1217, the CPU 202 of the image forming apparatus 101 generates a scan job on the basis of the scan job settings received in S1216 and starts the scan job.

In S1218, the CPU 202 of the image forming apparatus 101 transmits, to the information terminal 102, the HTTP response data with the HTTP response status code "200" having, attached thereto, the message "job in progress", which indicates that the scan job is being executed.

In S1219, when the CPU 302 of the information terminal 102 receives "job in progress" as a result of successful scan job generation, the CPU 302 displays the scan in progress screen 1013 on the display unit 308 and starts a status monitoring process to monitor the status of the image forming apparatus 101 at 100-msec intervals.

In S1220, the CPU 302 of the information terminal 102 transmits, to the image forming apparatus 101, an HTTP POST request to acquire the status of the image forming apparatus 101.

In S1221, the CPU 202 of the image forming apparatus 101 receives the HTTP POST request representing the status acquisition request transmitted in S1220 before completion of transmission of the image data. Then, the CPU 202 performs a process of transmitting, to the information terminal 102, the HTTP response data having the job status "job in progress" and having the HTTP response status code "200". At this time, the CPU 302 of the information terminal 102 continues to display the scan in progress screen 1013 as long as the job status received in S1221 is "job in progress".

When the scan job executed by the image forming apparatus 101 is completed, the CPU 202 of the image forming apparatus 101 transmits an HTTPS POST request in S1222. The HTTPS POST request has, attached thereto, the authentication information received in S1216. Furthermore, the message body part of the HTTPS POST request is the binary data of the scanned image. Then, the HTTPS POST request is transmitted to the address of the cloud server 103 received in S1216. Note that in this example, the address of the cloud server 103 is "https://aaa.com/Storage1". In addition, the authentication information received in S1216 is "dXNlcjE6cGFzc3dvcmQx".

When the transmission of image data is completed, the processing proceeds to S1223. In S1223, the CPU 402 of the cloud server 103 transmits, to the image forming apparatus 101, an HTTPS response data having the image data transmission result "transmission success" attached thereto and having the HTTPS response status code "200" as the response to the image data transmission.

In S1224, the CPU 302 of the information terminal 102 transmits an HTTP POST request for status acquisition to the image forming apparatus 101.

In S1225, the CPU 202 of the image forming apparatus 101 receives the HTTP POST request representing the status acquisition request transmitted in S1220 after the scan job is completed. Then, the CPU 202 of the image forming apparatus 101 transmits, to the information terminal 102, HTTP response data having the job status "transmission success" attached thereto and having the HTTP response status code "200".

In S1226, the CPU 302 of the information terminal 102 determines that the scanned image transmission is successful on the basis of the job status "transmission success" in the response data received in S1225 and, thus, causes the display unit 308 to display the transmission success screen 1015.

Scan Application Execution Process

Figure 14A:
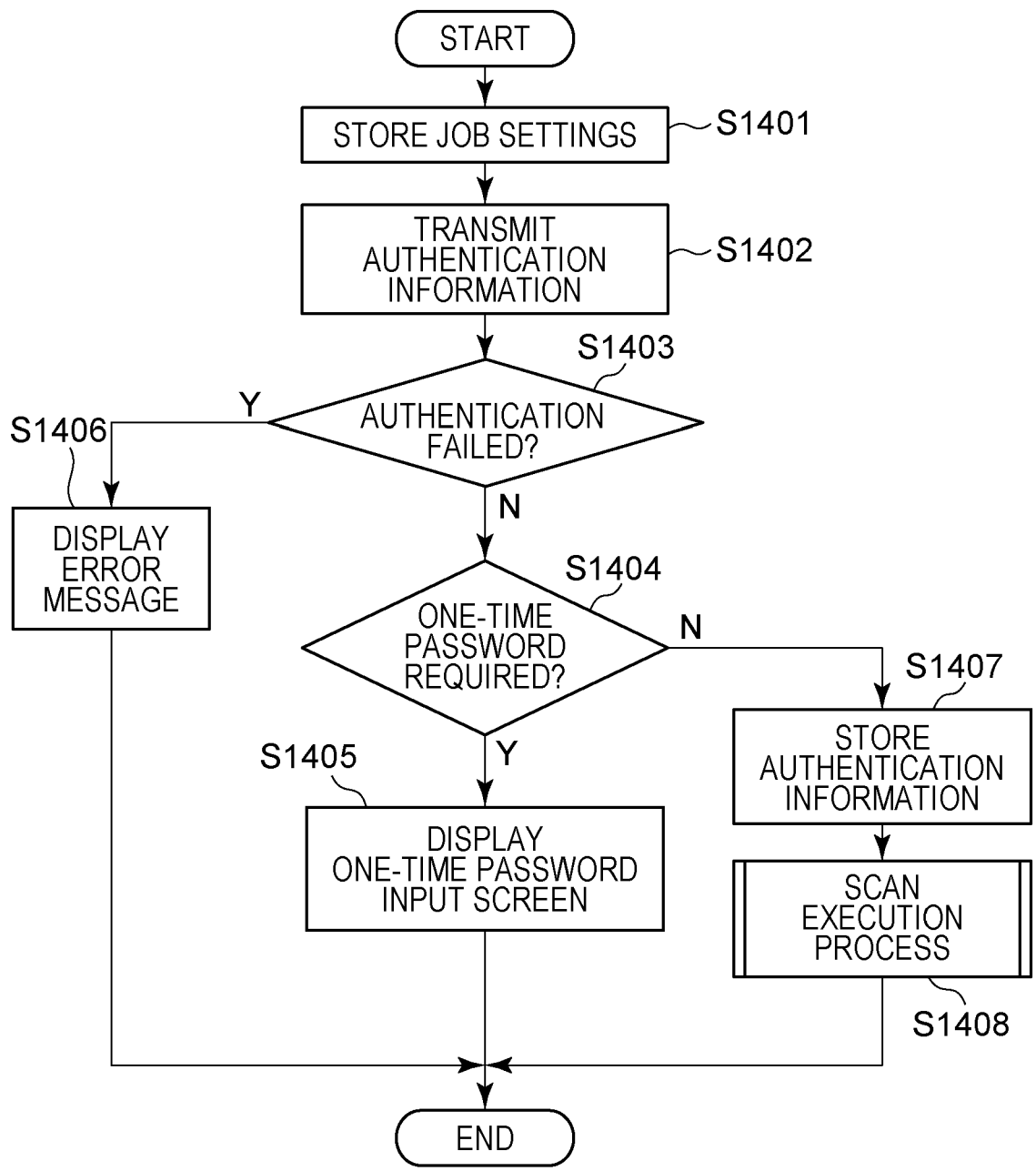
Figure 14B:
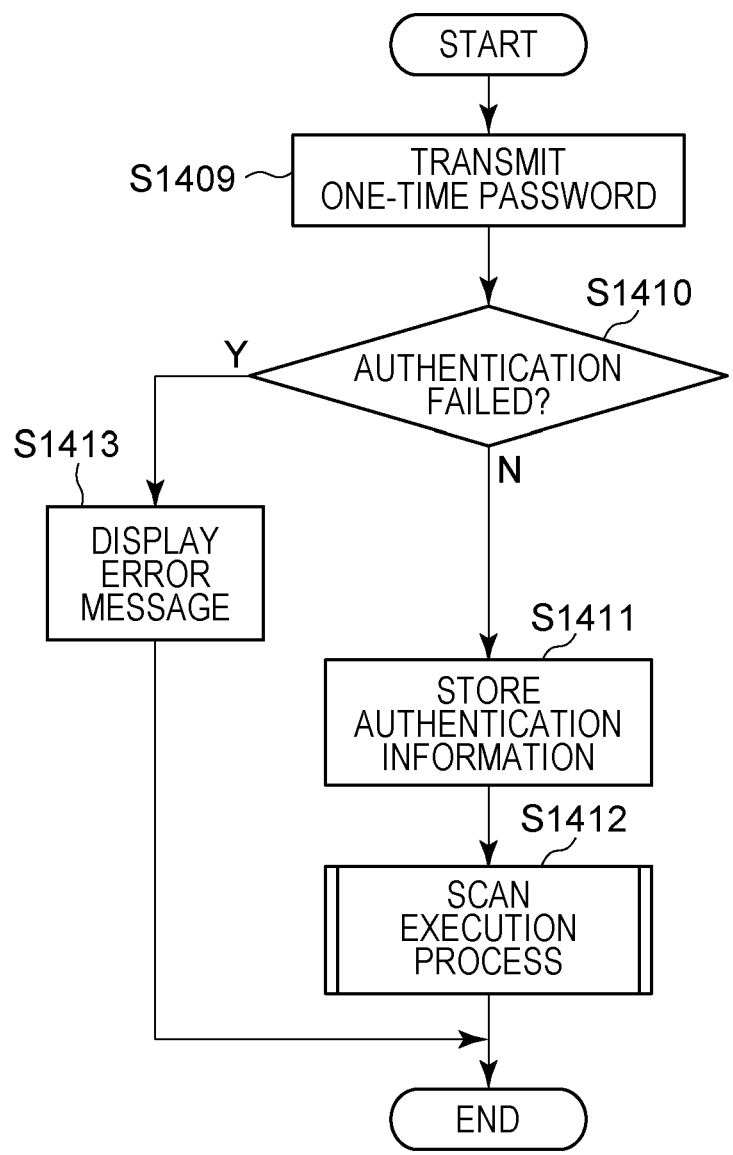

FIGS. 14A to 14C are flowcharts of the scan application execution process performed by the scan application of the information terminal 102 according to the first embodiment. Each of processes in the flowchart illustrated in FIGS. 14A to 14C is performed by the CPU 302 of the information terminal 102 loading the program stored in the ROM 304 into the RAM 303 and executing the program. It is assumed that the service URL registration process (FIGS. 8A and 8B) is performed, and the service URL information is stored in the storage 305 before the start of the scan application execution process.

The user performs setting of the color mode, the resolution, the input method, and the service URL via the scan setting screen 1003 and, thereafter, presses the scan start button 1008. Then, the CPU 302 of the information terminal 102 starts the first authentication process (FIG. 14A).

In S1401, the CPU 302 of the information terminal 102 stores, in the RAM 303, the color mode, resolution, input method, and service URL set via the scan setting screen 1003.

In S1402, the CPU 302 of the information terminal 102 transmits, to the cloud server 103 corresponding to the service URL set via the scan setting screen 1003, the first authentication request in the form of an HTTP POST request. The user ID and password corresponding to the service URL stored in the storage 305 are attached to the first authentication request, and the first authentication request is transmitted.

In S1403, if the HTTP response status code, which is the response to the first authentication request transmitted in S1402, is "401", the CPU 302 of the information terminal 102 determines that the authentication has failed.

If the determination result in S1403 is not an authentication failure and if the detailed status in the response to the first authentication request transmitted in S1402 is "transmission result notification", the CPU 302 of the information terminal 102 determines that a one-time password is required in S1404.

If the determination result in S1404 indicates that a one-time password is required, the CPU 302 of the information terminal 102 causes the display unit 308 to display the one-time password input screen 1009 in S1405.

If the determination result in S1403 indicates authentication failure, the CPU 302 of the information terminal 102 causes, in S1406, the display unit 308 to display the scan setting screen 1003 including an error message based on the details of an error acquired from the response to the first authentication request transmitted in S1402.

If the determination result in S1404 indicates that a one-time password is not required, the CPU 302 of the information terminal 102 stores, in S1407, the authentication information acquired from the response to the first authentication request in the RAM 303.

In S1408, the CPU 302 of the information terminal 102 performs the scan execution process (FIG. 14C).

When the user inputs the one-time password via the one-time password input screen 1009 and presses the send button 1011, the CPU 302 of the information terminal 102 performs the second authentication process (FIG. 14B).

In S1409, the CPU 302 of the information terminal 102 transmits, to the cloud server 103, the second authentication request in the form of an HTTP POST request. At this time, the second authentication request has, attached thereto, the one-time password input via the one-time password input screen 1009.

If, in S1410, the HTTP response status code in the response to the second authentication request transmitted in S1409 is "401", the CPU 302 of the information terminal 102 determines that the authentication has failed.

However, if the determination result in S1410 is not an authentication failure, the CPU 302 of the information terminal 102 stores, in the RAM 303, the authentication information acquired from the response to the second authentication request in S1411.

In S1412, the CPU 302 of the information terminal 102 performs the scan execution process (FIG. 14C).

If the determination result in S1410 is an authentication failure, the CPU 302 of the information terminal 102 causes the display unit 308 to display the one-time password input screen 1009 in S1413. At this time, the one-time password input screen 1009 includes an error message based on the details of error acquired from the response to the second authentication request transmitted in S1409.

In S1408 and S1412, the CPU 302 of the information terminal 102 executes the scan execution process (FIG. 14C).

In S1414, the CPU 302 of the information terminal 102 generates a scan job ticket (FIG. 13) on the basis of the designated color mode, resolution, input method, service URL, and the authentication information stored in the RAM 303. Then, the CPU 302 performs a process of transmitting the scan job ticket to the image forming apparatus 101 using an HTTP POST request.

In S1415, the CPU 302 of the information terminal 102 causes the display unit 308 to display the scan in progress screen 1013.

In S1416, the CPU 302 of the information terminal 102 transmits, to the image forming apparatus 101, a status acquisition request in the form of an HTTP POST request. At this time, the status acquisition request has, attached thereto, the job ID acquired from the response to the scan job ticket transmitted in S1414.

If, in S1417, the job status in the response to the transmitted status acquisition request is "job in progress", the CPU 302 of the information terminal 102 determines that the job is being executed and performs S1416 again after 100 msec elapses.

However, if the determination result in S1417 is not "job in progress" and if, in S1418, the job status in the response to the status acquisition request transmitted in S1416 is "transmission success", the CPU 302 of the information terminal 102 determines that the transmission is successful.

If, in S1418, the CPU 302 of the information terminal 102 determines that the transmission is successful, the CPU 302 of the information terminal 102 causes the display unit 308 to display the transmission success screen 1015 in S1419.

However, if, in S1418, the CPU 302 of the information terminal 102 determines that the transmission is not successful, the CPU 302 of the information terminal 102 causes the display unit 308 to display the error screen 1016 in S1420.

First Scanning Process Performed by Image Forming Apparatus

Figure 15:
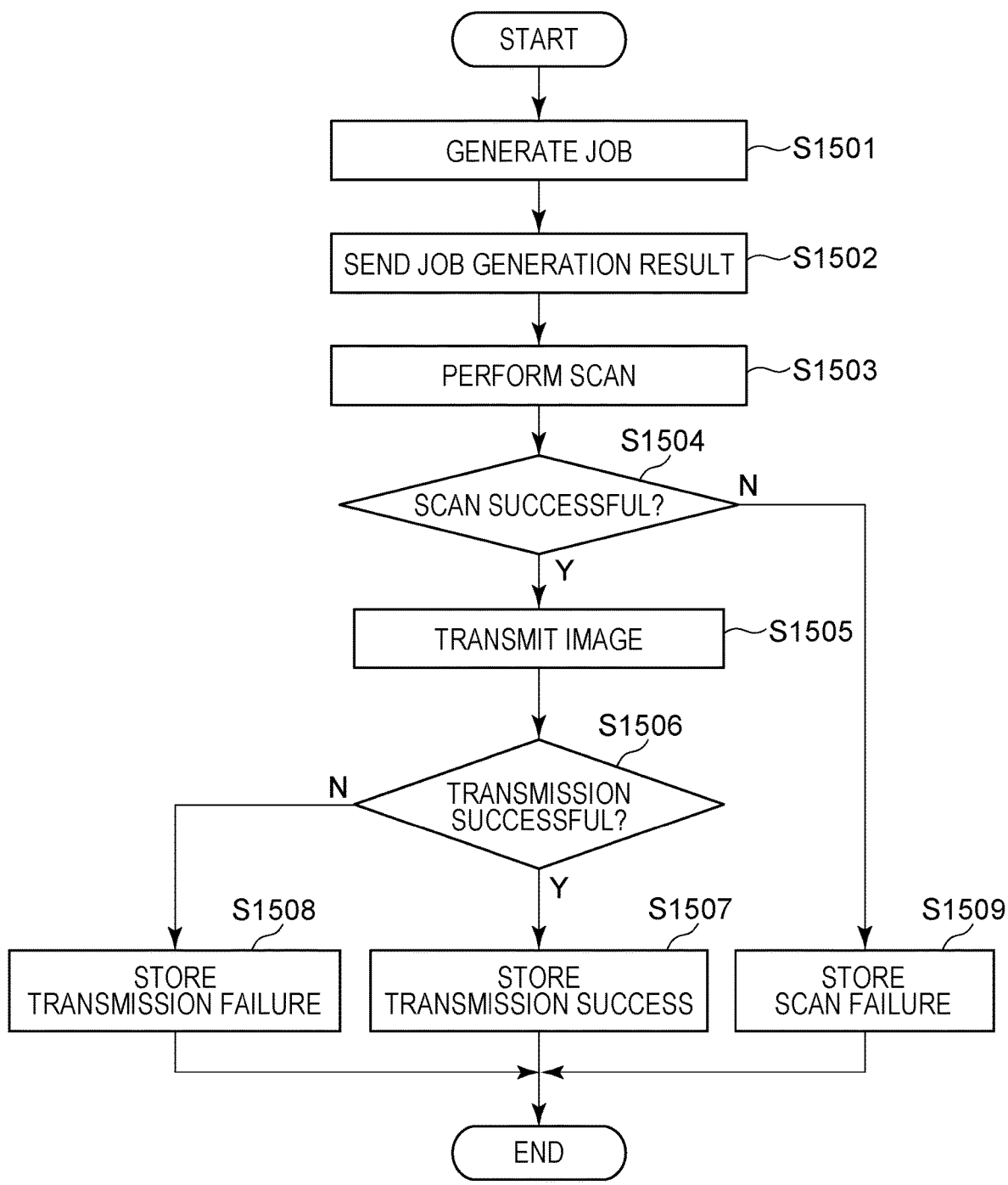
FIG. 15 is a flowchart of a scan job execution process performed by an image forming apparatus according to the embodiment.

FIG. 15 is a flowchart of the scanning process performed by the image forming apparatus 101 according to the first embodiment. Each of the processes in the flowchart illustrated in FIG. 15 is performed by the CPU 202 of the image forming apparatus 101 loading the program stored in the ROM 204 into the RAM 203 and executing the program. Upon receiving the scan job ticket in the form of an HTTP POST request from the information terminal 102, the CPU 202 of the image forming apparatus 101 starts the scanning process (FIG. 15).

In S1501, the CPU 202 of the image forming apparatus 101 generates job information including a job ID, which is an ID indicating a job, on the basis of the scan job ticket and stores the job information in the storage 205.

In S1502, the CPU 202 of the image forming apparatus 101 attaches the job ID of the scan job to HTTP response data having the HTTP response status code "200" and transmits the HTTP response data as the response to the scan job ticket.

In S1503, the CPU 202 of the image forming apparatus 101 performs scanning on the basis of the scan job information generated in S1501. The scanned image is stored in the storage 205 as scanned image data.

If, in S1504, the execution result of the scan job is "success", the CPU 202 of the image forming apparatus 101 determines that the scanning is successful.

If, in S1504, the CPU 202 of the image forming apparatus 101 determines that the scanning is successful, the CPU 202 of the image forming apparatus 101 transmits, in S1505, the image data transmission notification in the form of an HTTP POST request. At this time, the scanned image data in the storage 205 is attached to the image data transmission notification, and the image data transmission notification is transmitted to the cloud server 103 on the basis of the service URL and the authentication information in the scan job ticket.

If, in S1506, the transmission result of the response to the image data transmission notification transmitted in S1505 is "transmission success", the CPU 202 of the image forming apparatus 101 determines that the transmission is successful.

If, in S1506, the CPU 202 of the image forming apparatus 101 determines that the transmission is successful, the CPU 202 of the image forming apparatus 101 stores, in S1507, the job status "transmission success" in the job information of the storage 205 corresponding to the job ID of the job executed in S1503. The stored job status is transmitted to the information terminal 102 as the response to the status acquisition request transmitted in S1417.

However, if, in S1506, the CPU 202 of the image forming apparatus 101 determines that the transmission is not successful, the CPU 202 of the image forming apparatus 101 stores, in S1508, the job status "transmission failure" into the job information in the storage 205 corresponding to the job ID of the job executed in S1503.

If, in S1504, the CPU 202 of the image forming apparatus 101 determines that the scan is not successful, the CPU 202 of the image forming apparatus 101 stores, in S1508, the job status "scan failure" into the job information in the storage 205 corresponding to the job ID of the job executed in S1503.

Print Sequence

Figure 16:
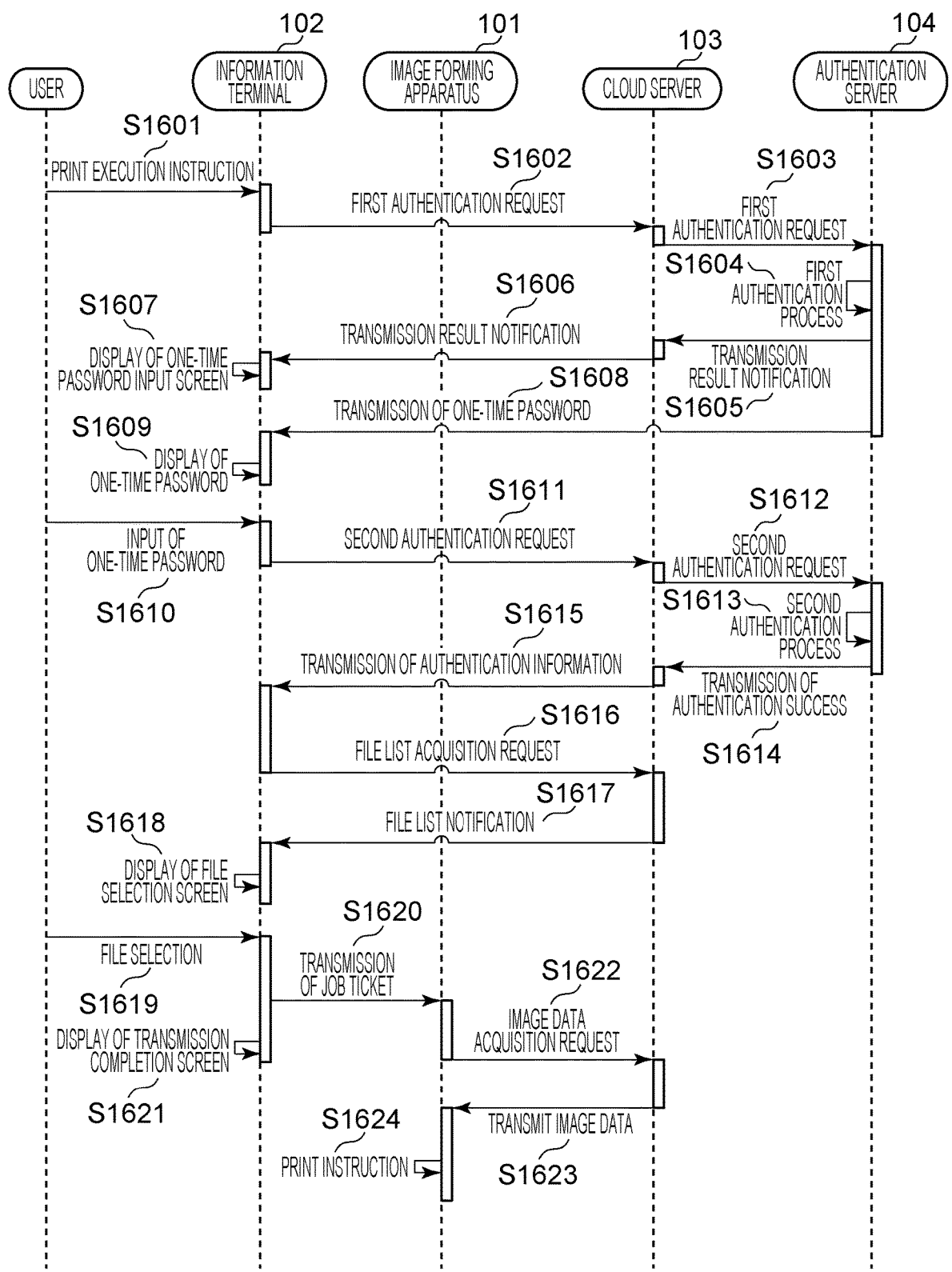
FIG. 16 is a print control sequence diagram according to the embodiment.

FIG. 16 illustrates an example of a technique in which authentication is performed by the cloud server 103 using two-factor authentication, an image stored in the cloud server 103 is acquired, and a print job that prints the image is executed, according to the first embodiment of the present disclosure. According to the present embodiment, a print job execution technique is described in the case where the cloud server 103 requires two-factor authentication for read permission, and the two-factor authentication is performed via the information terminal 102 before the print job is executed. In addition, according to the present embodiment, the information terminal 102, the image forming apparatus 101, the cloud server 103, and the authentication server 104 perform communication by using HTTP. Then, when the authentication server 104 transmits a one-time password to the information terminal 102, the one-time password is transmitted via SMS over a public line, and the information terminal 102 and the cloud server 103 perform primary authentication by basic authentication.

In S1601, the user uses a print application of the information terminal 102 to designate a device via the device selection screen 1100 and perform print job setting via the print setting screen 1103. Thereafter, the user presses the file selection button 1107 in the print setting screen 1103.

In S1602, the CPU 202 of the information terminal 102 transmits a first authentication request in the form of an HTTP POST request to the cloud server 103 corresponding to the service URL set in S1601. At this time, the user ID "user1" and the password "password1" corresponding to the service URL stored in the storage 305 are attached to the first authentication request, and the first authentication request is transmitted. In this case, the service URL is "https://aaa.com/Storage1".

In S1603, the CPU 402 of the cloud server 103 redirects the HTTP POST request received in S1602 to the authentication server 104.

In S1604, the CPU 502 of the authentication server 104 performs a first authentication process (FIG. 9A).

In S1605, the CPU 502 of the authentication server 104 transmits, to the cloud server 103, HTTP response data having the HTTP response status code "200" and the detailed status "transmission result notification" as the response to the first authentication request.

In S1606, the CPU 402 of the cloud server 103 redirects the HTTP response data received in S1605 to the information terminal 102.

In S1607, the CPU 302 of the information terminal 102 causes the display unit 308 to display the one-time password input screen 1108.

In S1608, the CPU 502 of the authentication server 104 transmits the one-time password "1111" generated in the first authentication process to the information terminal 102 via SMS over the public line 106.

In S1609, the CPU 302 of the information terminal 102 causes the display unit 308 to display the one-time password "1111" input in S1607 via an SMS application (not illustrated).

In S1610, the user inputs the one-time password "1111" confirmed in S1609 into the one-time password input screen 1108 using the operation unit 307 of the information terminal 102 and, thereafter, presses the send button 1110.

In S1611, the CPU 302 of the information terminal 102 transmits, to the cloud server 103, an HTTP POST request representing a second authentication request having, attached thereto, the one-time password "1111" input in S1610.

In S1612, the CPU 402 of the cloud server 103 redirects the HTTP POST request received in S1611 to the authentication server 104.

In S1613, the CPU 502 of the authentication server 104 performs the second authentication process (FIG. 9B).

In S1614, the CPU 502 of the authentication server 104 transmits HTTP response data to the cloud server 103 as a response to the second authentication request. At this time, the HTTP response status code "200", the detailed status "authentication success", and the authentication information "dXNlcjE6cGFzc3dvcmQx" are attached to the HTTP response data, and the HTTP response data is transmitted.

In S1615, the CPU 402 of the cloud server 103 redirects the HTTP response data received in S1614 to the information terminal 102.

In S1616, the CPU 302 of the information terminal 102 attaches the service URL set in S1601 and the authentication information acquired in S1615 to a file acquisition request and transmits the file acquisition request to the cloud server 103 in the form of an HTTP POST request. In this example, the service URL set in the cloud server 103 in S1601 is "https://aaa.com/Storage1". In addition, the authentication information acquired in S1615 is "dXNlcjE6cGFzc3dvcmQx".

In S1617, the CPU 402 of the cloud server 103 transmits, to the information terminal 102, HTTP response data having the file names stored at the service URL as a response to the file acquisition request. In this example, the service URL is "https://aaa.com/Storage1". In addition, the file names are "aaa.jpg" and "bbb.pdf".

In S1618, the CPU 302 of the information terminal 102 causes the display unit 308 to display the file selection screen 1112 including the file names "aaa.jpg" and "bbb.pdf", which are acquired in S1617, in the form of the file list 1113.

In S1619, the user selects the file "aaa.jpg" in the file list 1113 using the operation unit 307 of the information terminal 102 and presses the print start button 1114.

In S1620, the CPU 302 generates a job command on the basis of the print job settings set in S1601, a file URL obtained by concatenating the service URL set in S1601 with the file name selected in S1619, and the authentication information received in S1615. In this example, the service URL is "https://aaa.com/Storage1". The file URL is "https://aaa.com/Storage1/aaa.jpg". The authentication information is "dXNlcjE6cGFzc3dvcmQx". Then, the CPU 302 performs a process of transmitting a print job ticket (FIG. 17) to the image forming apparatus 101 designated in S1601.

In S1621, the CPU 302 of the information terminal 102 causes the display unit 308 to display the print start screen 1116.

In S1622, the CPU 202 of the image forming apparatus 101 transmits, to the cloud server 103, an image data acquisition request having, attached thereto, the file URL received in S1620 and the authentication information in the form of an HTTP POST request.

In S1623, the CPU 302 of the cloud server 103 transmits, to the information terminal 102, HTTP response data having, attached thereto, the image data of the file designated by the file URL, as a response to the image data acquisition request.

In S1624, the CPU 202 of the image forming apparatus 101 generates a print job on the basis of the print job settings received in S1620 and starts printing the image data acquired in S1622.

Print Application Execution Process

Figure 18A:
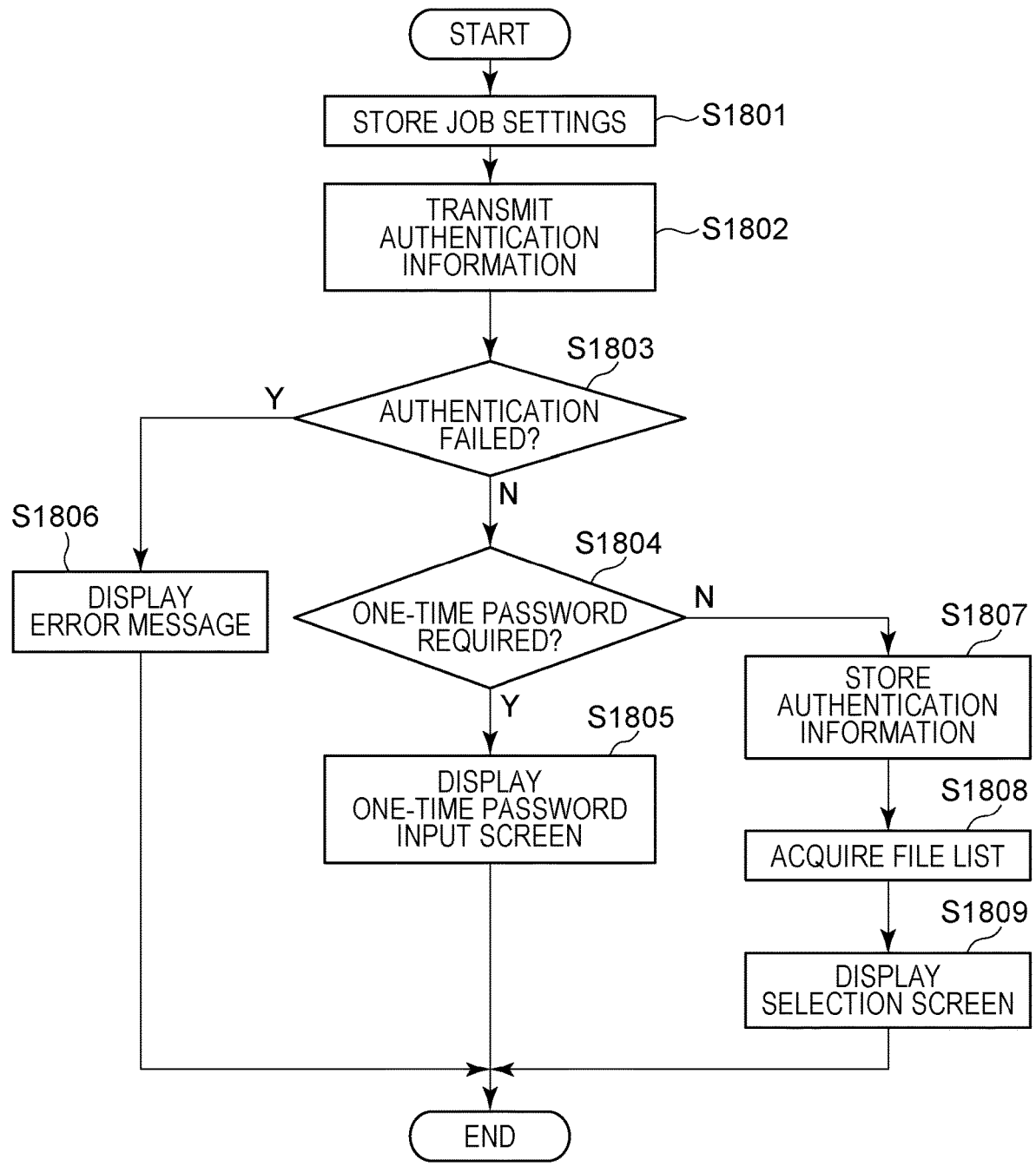
FIGS. 18A to 18C are flowcharts relating to a print job process according to the embodiment.
Figure 18B:
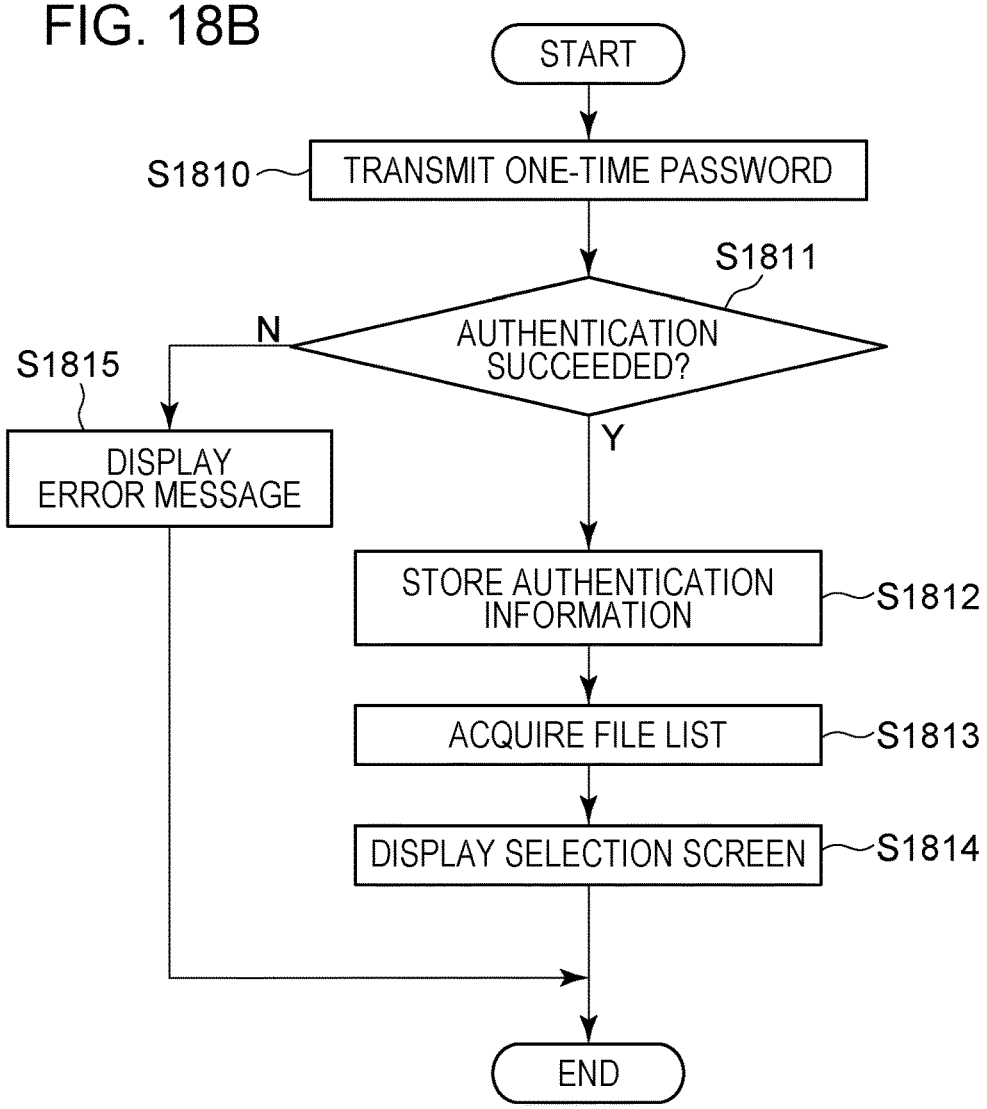
Figure 18C:
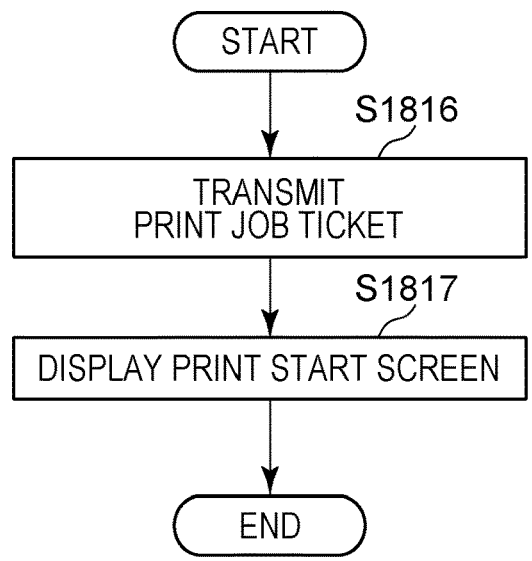

FIGS. 18A to 18C are flowcharts of a print application execution process (a printing process performed by the print application of the information terminal 102) according to the first embodiment. Each of the processes in the flowchart illustrated in FIGS. 18A to 18C is performed by the CPU 302 of the information terminal 102 loading the program stored in the ROM 304 into the RAM 303 and executing the program. It is assumed that before the start of the print application execution process, the service URL registration process (FIGS. 8A and 8B) is executed, and the service URL information is stored in the storage 305.

When the user performs setting of the color mode, two-sided printing, and service URL via the print setting screen 1103 and, thereafter, presses the file selection button 1107, the CPU 302 of the information terminal 102 performs a first authentication process (FIG. 18A).

In S1801, the CPU 302 of the information terminal 102 stores, in the RAM 303, the color mode, resolution, input method, and service URL designated and set via the print setting screen 1103.

In S1802, the CPU 302 of the information terminal 102 transmits, to the cloud server 103 corresponding to the service URL set via the print setting screen 1103, a first authentication request in the form of an HTTP POST request. At this time, the user ID and password corresponding to the service URL stored in the storage 305 are attached to the first authentication request, and the first authentication request is transmitted.

If, in S1803, the HTTP response status code in the response to the first authentication request transmitted in S1802 is "401", the CPU 302 of the information terminal 102 determines that the authentication has failed.

If the determination result in S1803 is not an authentication failure and if the detailed status of the response to the first authentication request transmitted in S1802 is "transmission result notification", the CPU 302 of the information terminal 102 determines that a one-time password is required in S1804.

If the determination result in S1804 is that a one-time password is required, the CPU 302 of the information terminal 102 causes, in S1805, the display unit 308 to display the one-time password input screen 1108.

However, if the determination result in S1803 is authentication failure, the CPU 302 of the information terminal 102 causes, in S1806, the display unit 308 to display the print setting screen 1103. At this time, the print setting screen 1103 includes an error message based on the details of the error acquired from the response to the first authentication request transmitted in S1802.

If the determination result in S1804 is that a one-time password is not required, the CPU 302 of the information terminal 102 stores, in S1807, the authentication information acquired from the response to the first authentication request into the RAM 303.

In S1808, the CPU 302 of the information terminal 102 attaches the service URL acquired in S1801 and the authentication information acquired in S1807 to a file acquisition request and transmits the file acquisition request in the form of an HTTP POST request.

In S1809, the CPU 302 of the information terminal 102 causes the display unit 308 to display the file selection screen 1112 in which the file names attached to the response to the file acquisition request transmitted in S1807 are included as the file list 1113.

When the user inputs the one-time password via the one-time password input screen 1108 and, thereafter, presses the send button 1110, the CPU 302 of the information terminal 102 performs the second authentication process (FIG. 18B).

In S1810, the CPU 302 of the information terminal 102 transmits, to the cloud server 103, a second authentication request having, attached thereto, the one-time password input via the one-time password input screen 1108 in the form of an HTTP POST request.

If, in S1811, the HTTP response status code in the response to the second authentication request transmitted in S1810 is "401", the CPU 302 of the information terminal 102 determines that the authentication has failed.

If the determination result in S1811 is not an authentication failure, the CPU 302 of the information terminal 102 stores, in S1812, the authentication information acquired from the response to the second authentication request into the RAM 303.

In S1813, the CPU 302 of the information terminal 102 attaches the service URL stored in the RAM 303 and the authentication information to a file acquisition request and transmits the file acquisition request in the form of an HTTP POST request.

In S1814, the CPU 302 of the information terminal 102 causes the display unit 308 to display the file selection screen 1112 including the file names attached to the response to the file acquisition request transmitted in S1813 as the file list 1113.

If the determination result in S1811 is an authentication failure, the CPU 302 of the information terminal 102 causes, in S1815, the display unit 308 to display the one-time password input screen 1108 including an error message based on the details of the error acquired from the response to the second authentication request transmitted in S1811.

When the user selects a least one of the file names in the file list 1113 in the file selection screen 1112 and presses the print start button 1114, the print execution process (FIG. 18C) is performed.

In S1816, the CPU 302 of the information terminal 102 generates a print job ticket on the basis of the settings of the designated color mode and two-sided printing, the authentication information stored in the RAM 303, and a file URL obtained by concatenating the service URL with the file name selected from the file list 1113. An example of a print job ticket is illustrated in FIG. 17. Thereafter, the CPU 302 transmits the generated print job ticket to the image forming apparatus 101 in the form of an HTTP POST request.

In S1817, the CPU 302 of the information terminal 102 causes the display unit 308 to display the print start screen 1116.

Printing Process Performed by Image Forming Apparatus

Figure 19:
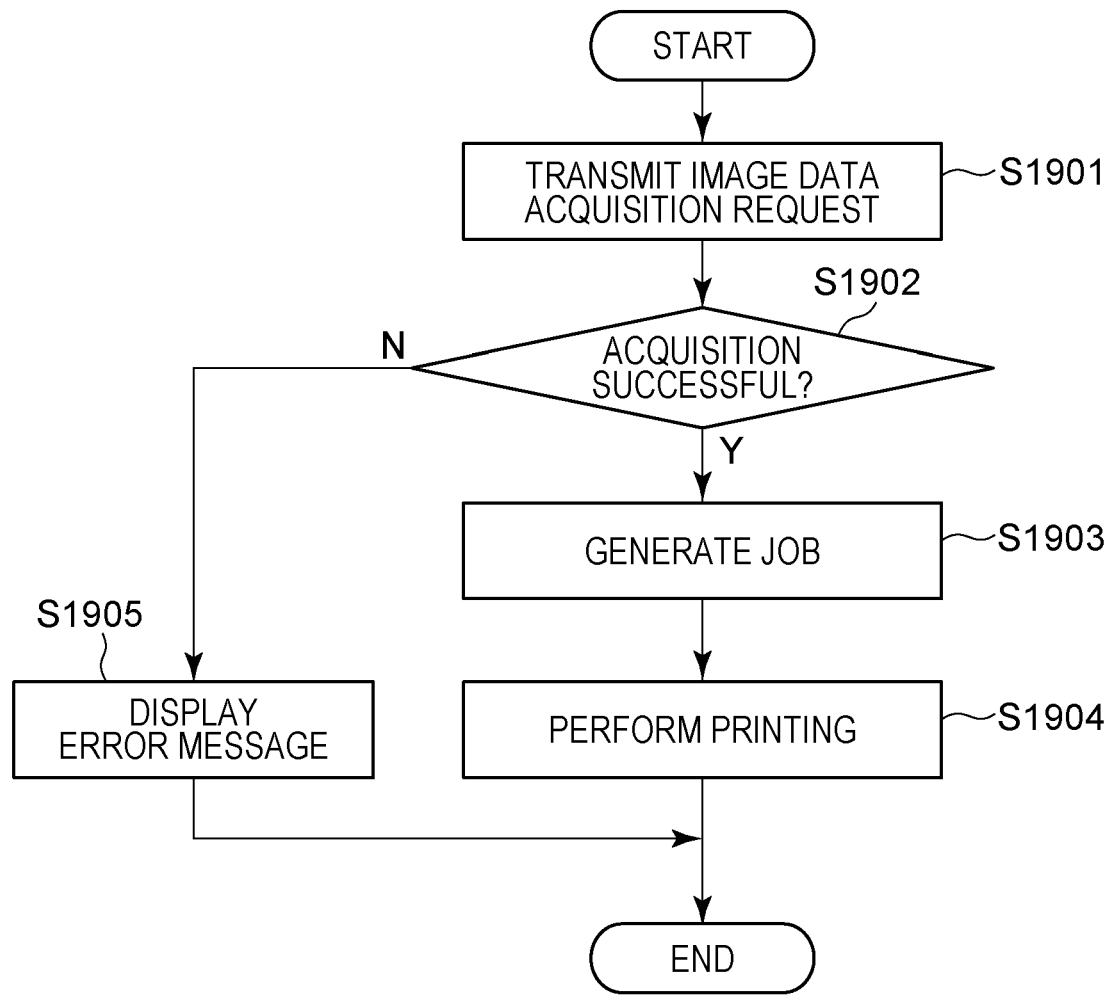
FIG. 19 is a flowchart of a print job execution process according to the embodiment.

FIG. 19 is a flowchart of the printing process performed by the image forming apparatus 101 according to the first embodiment. Each of the processes in the flowchart illustrated in FIG. 19 is performed by the CPU 202 of the image forming apparatus 101 loading the program stored in the ROM 204 into the RAM 203 and executing the program. Upon receiving, from the information terminal 102, the print job ticket in the form of an HTTP POST request, the CPU 202 of the image forming apparatus 101 starts the printing process.

In S1901, the CPU 202 of the image forming apparatus 101 transmits an image data acquisition request in the form of an HTTP POST request to the cloud server 103 on the basis of the file URL in the print job ticket. At this time, the image data acquisition request has, attached thereto, the authentication information in the print job ticket.

In S1902, the CPU 202 of the image forming apparatus 101 determines that the acquisition is successful if the HTTP response status code in the response to the image data acquisition request transmitted in S1901 is "200".

If, in S1902, the CPU 202 of the image forming apparatus 101 determines that the acquisition is successful, the processing performed by the CPU 202 of the image forming apparatus 101 proceeds to S1903. In S1903, the CPU 202 generates print job information including the image data attached to the response to the image data acquisition request transmitted in S1901 and a job ID, which is an ID indicating a job, on the basis of the print job ticket. Then, the CPU 202 stores the print job information in the storage 205.

In S1904, the CPU 202 of the image forming apparatus 101 performs printing on the basis of the print job information generated in S1903.

If, in S1902, the CPU 202 of the image forming apparatus 101 determines that the acquisition is not successful, the CPU 202 of the image forming apparatus 101 displays an error screen on the operation panel 208 in S1905.

While the present embodiment has been described with reference to the first scan control sequence and the print control sequence as a method for controlling the image forming apparatus using the authentication information acquired via two-factor authentication, the present disclosure is not limited thereto.

By performing two-factor authentication as described above, the image forming apparatus can receive control instructions only from the information terminal used by the user, so that a spoofing attack can be prevented.

Second Embodiment

First Sequence to Perform Scan and Authentication in Parallel

Figure 20:
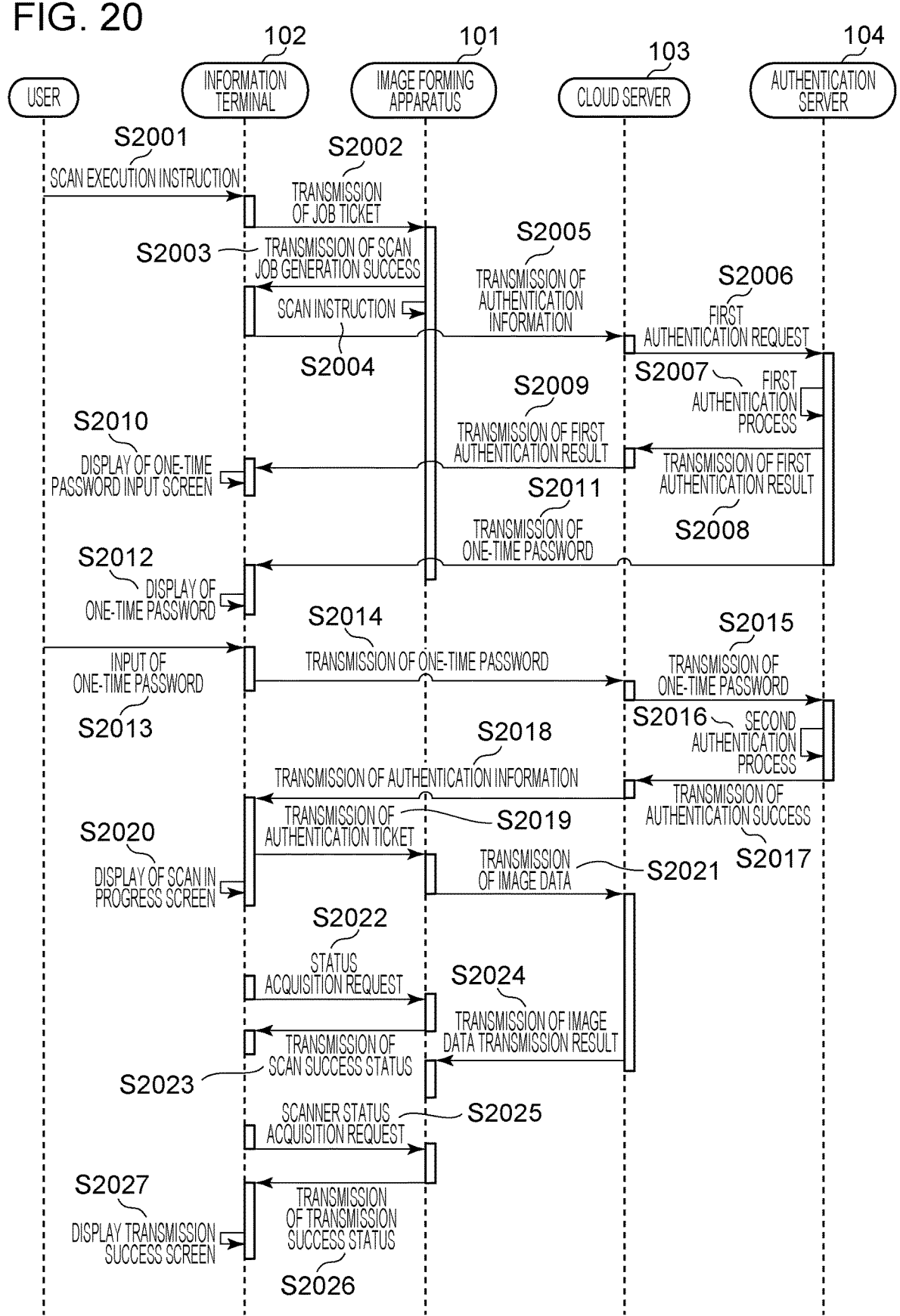
FIG. 20 is a sequence diagram illustrating second scan control according to the embodiment.

FIG. 20 is a sequence diagram illustrating an example of the case in which the two-factor authentication at the cloud server 103 and the scan job instruction to transmit an image to the cloud server 103 are performed at the same time, and the scan job ends first, according to the second embodiment of the present disclosure. According to the present embodiment, a scan job execution technique is described in settings where the cloud server 103 requires two-factor authentication for write permission, and the two-factor authentication is performed via the information terminal 102 before the scan job is executed. In addition, according to the present embodiment, the information terminal 102, the image forming apparatus 101, the cloud server 103, and the authentication server 104 perform communication using HTTP. Then, when the one-time password is sent from the authentication server 104 to the information terminal 102, SMS is used over a public line, and the information terminal 102 and the cloud server 103 perform primary authentication by basic authentication.

In S2001, the user uses a scan application on the information terminal 102 to designate a device via the device selection screen 1000 and perform scan job setting via the scan setting screen 1003. Thereafter, the user presses the scan start button 1008 in the scan setting screen 1003.

In S2002, the CPU 302 of the information terminal 102 generates a job command on the basis of the scan job settings set in S2001 and the service URL "https://aaa.com/Storage1" set in S2001. Then, the CPU 302 of the information terminal 102 performs a process of transmitting a scan job ticket (FIG. 22) to the image forming apparatus 101 designated in S2001.

In S2003, the CPU 202 of the image forming apparatus 101 generates a job on the basis of the scan job ticket received in S2002. Then, the CPU 202 performs a process of transmitting, to the information terminal 102, HTTP response data including a job ID which is the ID of the generated job and the HTTP response status code "200" having, attached thereto, "scan success" indicating that the scan job is performed.

In S2004, the CPU 202 of the image forming apparatus 101 starts a scan job based on the scan job generated in S2003.

In S2005, the CPU 202 of the information terminal 102 transmits, to the cloud server 103 corresponding to the service URL "https://aaa.com/Storage1" set in S2001, the first authentication request in the form of an HTTP POST request. At this time, the user ID "user1" and the password "password1" corresponding to the service URL stored in the storage 305 are attached to the first authentication request, and the first authentication request is transmitted.

In S2006, the CPU 402 of the cloud server 103 redirects the HTTP POST request received in S2003 to the authentication server 104.

In S2007, the CPU 502 of the authentication server 104 performs the first authentication process (FIG. 9A).

In S2008, the CPU 502 of the authentication server 104 transmits, to the cloud server 103, HTTP response data including the HTTP response status code "200" and the detailed status "transmission result notification" as a response to the first authentication request.

In S2009, the CPU 402 of the cloud server 103 redirects the HTTP response data received in S2007 to the information terminal 102.

In S2010, the CPU 302 of the information terminal 102 causes the display unit 308 to display the one-time password input screen 1009.

In S2011, the CPU 502 of the authentication server 104 transmits the one-time password "1111" generated in the first authentication process to the information terminal 102 using SMS over the public line 106.

In S2012, the CPU 302 of the information terminal 102 causes the display unit 308 to display the one-time password "1111" received in S2011 via an SMS application (not illustrated).

In S2013, the user inputs the one-time password "1111" displayed in S2012 into the one-time password input screen 1009 by using the operation unit 307 of the information terminal 102 and, thereafter, presses the send button 1011.

In S2014, the CPU 302 of the information terminal 102 transmits, to the cloud server 103, a second authentication request having, attached thereto, the one-time password "1111" input in S2013 in the form of an HTTP POST request.

In S2015, the CPU 402 of the cloud server 103 redirects the HTTP POST request received in S2014 to the authentication server 104.

In S2016, the CPU 502 of the authentication server 104 performs the second authentication process (FIG. 9B).

In S2017, the CPU 502 of the authentication server 104 transmits HTTP response data to the cloud server 103 as a response to the second authentication request. At this time, the HTTP response status code "200", the detailed status "authentication success", and the authentication information "dXNlcjE6cGFzc3dvcmQx" are attached to the HTTP response data, and the HTTP response data is transmitted.

In S2018, the CPU 402 of the cloud server 103 redirects the HTTP response data received in S2017 to the information terminal 102.

In S2019, the CPU 302 of the information terminal 102 generates an authentication command on the basis of the job ID acquired in S2003, the service URL set in S2001, and the authentication information acquired in S2017. Thereafter, the CPU 302 transmits an authentication ticket (FIG. 23) to the image forming apparatus 101 designated in S2001. In this example, the service URL set in S2001 is "https://aaa.com/Storage1", and the authentication information acquired in S2017 is "dXNlcjE6cGFzc3dvcmQx".

In S2020, after transmitting the authentication ticket in S2019, the CPU 302 of the information terminal 102 displays the scan in progress screen 1013 on the display unit 308 and starts the status monitoring process of monitoring the status of the image forming apparatus 101 at 100-msec intervals.

In S2021, the CPU 202 of the image forming apparatus 101 attaches the authentication information received in S2019 to an HTTP header for the address of the cloud server 103 received in S2019. Then, the CPU 202 performs a process of transmitting an HTTPS POST request having the binary data of the scanned image in the message body part. In this example, the destination of the cloud server 103 is "https://aaa.com/Storage1", and the authentication information received in S2019 is "dXNlcjE6cGFzc3dvcmQx".

In S2022, the CPU 302 of the information terminal 102 transmits, to the image forming apparatus 101, an HTTP POST request for status acquisition.

In S2023, the CPU 202 of the image forming apparatus 101 receives the HTTP POST request for status acquisition transmitted in S2022 before the transmission of the image data is completed. Then, the CPU 202 performs a process of transmitting, to the information terminal 102, HTTP response data having the HTTP response status code "200" and having the job status "scan success" attached thereto. At this time, the CPU 302 of the information terminal 102 continues to display the scan in progress screen 1013 as long as the job status received in S2023 is "job in progress".

When the transfer of image data is completed, the processing proceeds to S2024. In S2024, the CPU 402 of the cloud server 103 transmits, to the image forming apparatus 101, HTTPS response data having the HTTPS response status code "200" and having, attached thereto, the image data transmission result "transmission success" as the response to the image data transmission.

In S2025, the CPU 302 of the information terminal 102 transmits an HTTP POST request for status acquisition to the image forming apparatus 101.

In S2026, the CPU 202 of the image forming apparatus 101 receives the HTTP POST request representing a status acquisition request and transmitted in S2025 after the scan job is completed. Thereafter, the CPU 202 performs a process of transmitting, to the information terminal 102, HTTP response data having the HTTP response status code "200" and having, attached thereto, the job status "transmission success".

In S2027, the CPU 302 of the information terminal 102 determines that the scanned image transmission is successful on the basis of the job status "transmission success" in the response data received in S2026 and, thus, causes the display unit 308 to display the transmission success screen 1015.

Second Sequence to Perform Scan and Authentication in Parallel

Figure 21:
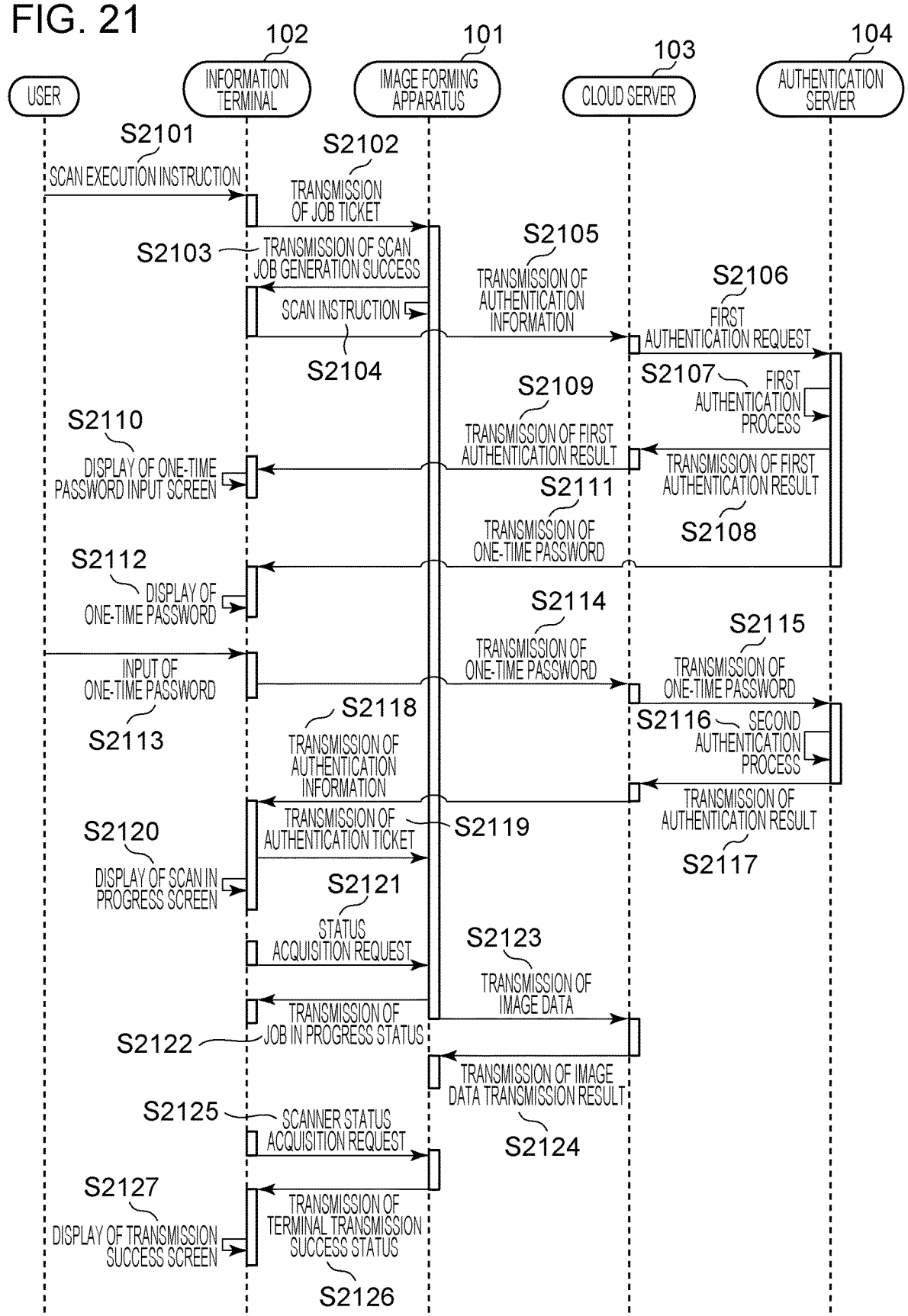
FIG. 21 is a sequence diagram illustrating third scan control according to the embodiment.

FIG. 21 is a sequence diagram illustrating an example of the case in which the two-factor authentication at the cloud server 103 and the scan job instruction to transmit an image to the cloud server 103 are performed at the same time, and the authentication ends first, according to the second embodiment of the present disclosure. According to the present embodiment, a scan job execution technique is described in settings where the cloud server 103 requires the two-factor authentication for write permission, and the two-factor authentication is performed via the information terminal 102 before the scan job is executed. In addition, according to the present embodiment, the information terminal 102, the image forming apparatus 101, the cloud server 103, and the authentication server 104 perform communication using HTTP. Then, when the one-time password is transmitted from the authentication server 104 to the information terminal 102, SMS is used over a public line, and the information terminal 102 and the cloud server 103 perform primary authentication by basic authentication.

In S2101, the user uses a scan application on the information terminal 102 to designate a device in the device selection screen 1000 and performs scan job setting via the scan setting screen 1003 and, thereafter, presses the scan start button 1008 in the scan setting screen 1003.

In S2102, the CPU 302 of the information terminal 102 generates a job command on the basis of the scan job settings set in S2101 and the service URL set in S2101. Then, the CPU 302 performs a process of transmitting a scan job ticket (FIG. 22) to the image forming apparatus 101 designated in S2101. In this example, the service URL set in S2101 is "https://aaa.com/Storage1".

In S2103, the CPU 202 of the image forming apparatus 101 generates a job on the basis of the scan job ticket received in S2102. Thereafter, the CPU 202 transmits, to the information terminal 102, HTTP response data having the HTTP response status code "200" and having, attached thereto, a job ID which is the ID of the generated job and the status "job in progress" indicating that the scan job is in progress.

In S2104, the CPU 202 of the image forming apparatus 101 starts a scan job based on the scan job generated in S2103.

In S2105, the CPU 202 of the information terminal 102 transmits, to the cloud server 103 corresponding to the service URL "https://aaa.com/Storage1" set in S2101, a first authentication request in the form of an HTTP POST request. At this time, the user ID "user1" and the password "password1" corresponding to the service URL stored in the storage 305 are attached to the first authentication request, and the first authentication request is transmitted.

In S2106, the CPU 402 of the cloud server 103 redirects the HTTP POST request received in S2103 to the authentication server 104.

In S2107, the CPU 502 of the authentication server 104 performs the first authentication process (FIG. 9A).

In S2108, the CPU 502 of the authentication server 104 transmits, to the cloud server 103, HTTP response data having, attached thereto, the HTTP response status code "200" and the detailed status "transmission result notification" as the response to the first authentication request.

In S2109, the CPU 402 of the cloud server 103 redirects the HTTP response data received in S2107 to the information terminal 102.

In S2110, the CPU 302 of the information terminal 102 causes the display unit 308 to display the one-time password input screen 1009.

In S2111, the CPU 502 of the authentication server 104 transmits, to the information terminal 102, the one-time password "1111" generated in the first authentication process via SMS over the public line 106.

In S2112, the CPU 302 of the information terminal 102 causes the display unit 308 to display the one-time password "1111" received in S2111 via an SMS application (not illustrated).

In S2113, the user uses the operation unit 307 of the information terminal 102 and inputs the one-time password "1111" displayed in S2112 into the one-time password input screen 1009 and, thereafter, presses the send button 1011.

In S2114, the CPU 302 of the information terminal 102 transmits, to the cloud server 103, a second authentication request having, attached thereto, the one-time password "1111" input in S2113 in the form of an HTTP POST request.

In S2115, the CPU 402 of the cloud server 103 redirects the HTTP POST request received in S2114 to the authentication server 104.

In S2116, the CPU 502 of the authentication server 104 performs a second authentication process (FIG. 9B).

In S2117, the CPU 502 of the authentication server 104 transmits, to the cloud server 103, HTTP response data having, attached thereto, the HTTP response status code, the detailed status "authentication success", and the authentication information as the response to the second authentication request. In this example, the HTTP response status code is "200", and the authentication information is "dXNlcjE6cGFzc3dvcmQx".

In S2118, the CPU 402 of the cloud server 103 redirects the HTTP response data received in S2117 to the information terminal 102.

In S2119, the CPU 302 of the information terminal 102 generates an authentication command on the basis of the job ID acquired in S2103, the service URL set in S2101, and the authentication information "dXNlcjE6cGFzc3dvcmQx" acquired in S2117. Then, the CPU 202 performs a process of transmitting an authentication ticket (FIG. 23) to the image forming apparatus 101 designated in S2101. In this example, the service URL is "https://aaa.com/Storage1".

In S2120, the CPU 302 of the information terminal 102 displays the scan in progress screen 1013 on the display unit 308 after transmitting the authentication ticket in S2119 and starts a status monitoring process of monitoring the status of the image forming apparatus 101 at 100-msec intervals.

In S2121, the CPU 302 of the information terminal 102 transmits an HTTP POST request for status acquisition to the image forming apparatus 101.

In S2122, the CPU 202 of the image forming apparatus 101 receives the HTTP POST request for status acquisition transmitted in S2121 before transmission of the image data is completed. Thereafter, the CPU 202 performs a process of transmitting, to the information terminal 102, HTTP response data having the HTTP response status code "200" and having the job status "job in progress" attached thereto. At this time, the CPU 302 of the information terminal 102 continues to display the scan in progress screen 1013 as long as the job status received in S2122 is "job in progress".

When the scan job is completed, the CPU 202 of the image forming apparatus 101 transmits, in S2123, an HTTPS POST request to the address of the cloud server 103 ("https://aaa.com/Storage1") received in S2119. More specifically, the CPU 202 attaches the authentication information "dXNlcjE6cGFzc3dvcmQx" received in S2119 to the HTTP header and transmits the HTTPS POST request having the binary data of the scanned image in the message body part.

When the transfer of image data is completed, the processing proceeds to S2124. In S2124, the CPU 402 of the cloud server 103 transmits, to the information terminal 102, HTTPS response data having the HTTPS response status code "200" and having, attached thereto, the image data transmission result "transmission success" as a response to the image data transmission.

In S2125, the CPU 302 of the information terminal 102 transmits an HTTP POST request for status acquisition to the image forming apparatus 101.

In S2126, the CPU 202 of the image forming apparatus 101 receives an HTTP POST request for status acquisition transmitted in S2125 after the scan job is completed. Thereafter, the CPU 202 performs a process of transmitting, to the information terminal 102, HTTP response data having the HTTP response status code "200" and having the job status "transmission success" attached thereto.

In S2127, the CPU 302 of the information terminal 102 determines that the scanned image transmission is successful on the basis of the job status "transmission success" in the response data received in S2126 and causes the display unit 308 to display the transmission success screen 1015.

Second Scanning Process Performed by Image Forming Apparatus

Figure 24A:
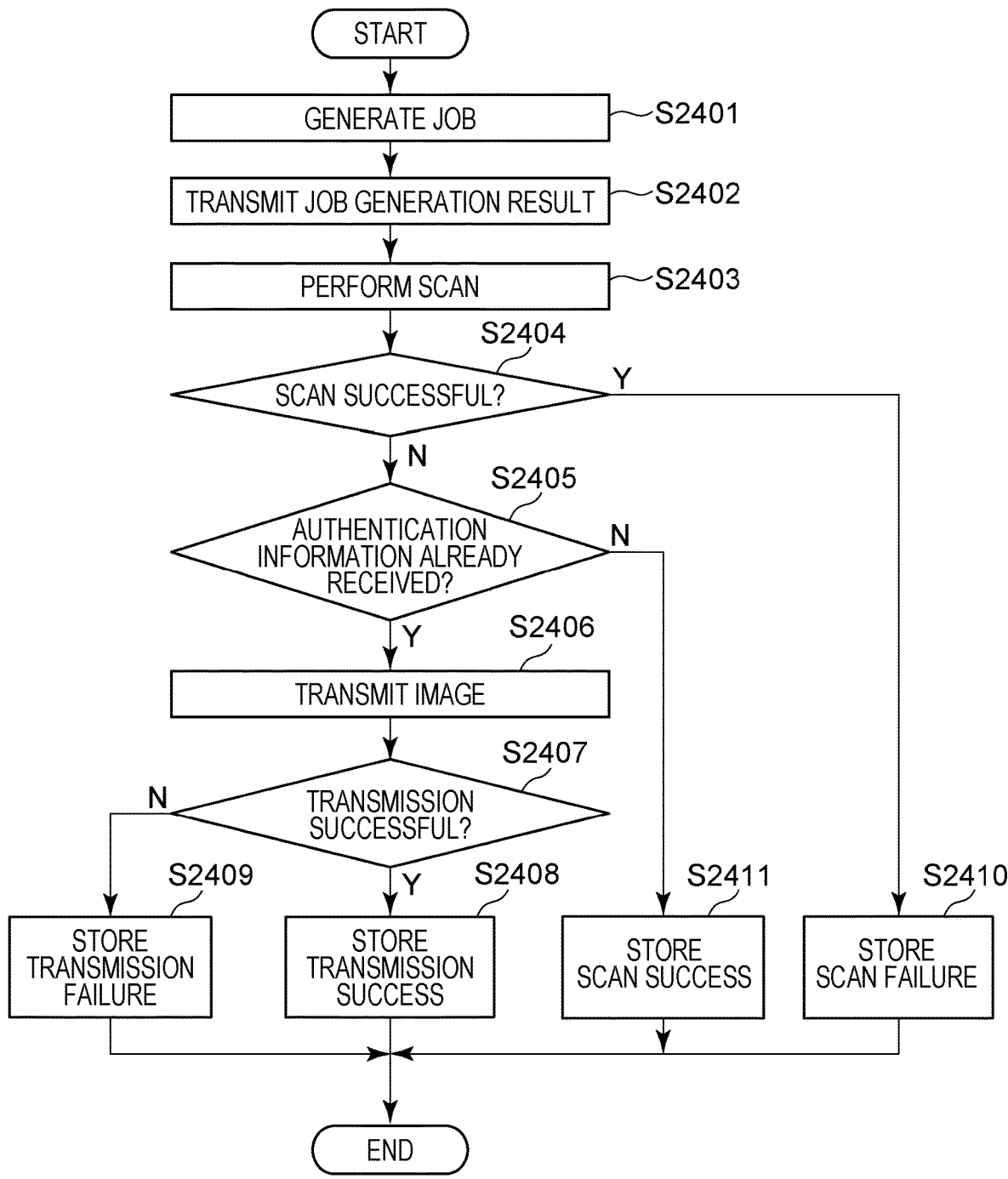
FIGS. 24A and 24B are flowcharts illustrating an example of scan job execution processes according to the embodiment.
Figure 24B:
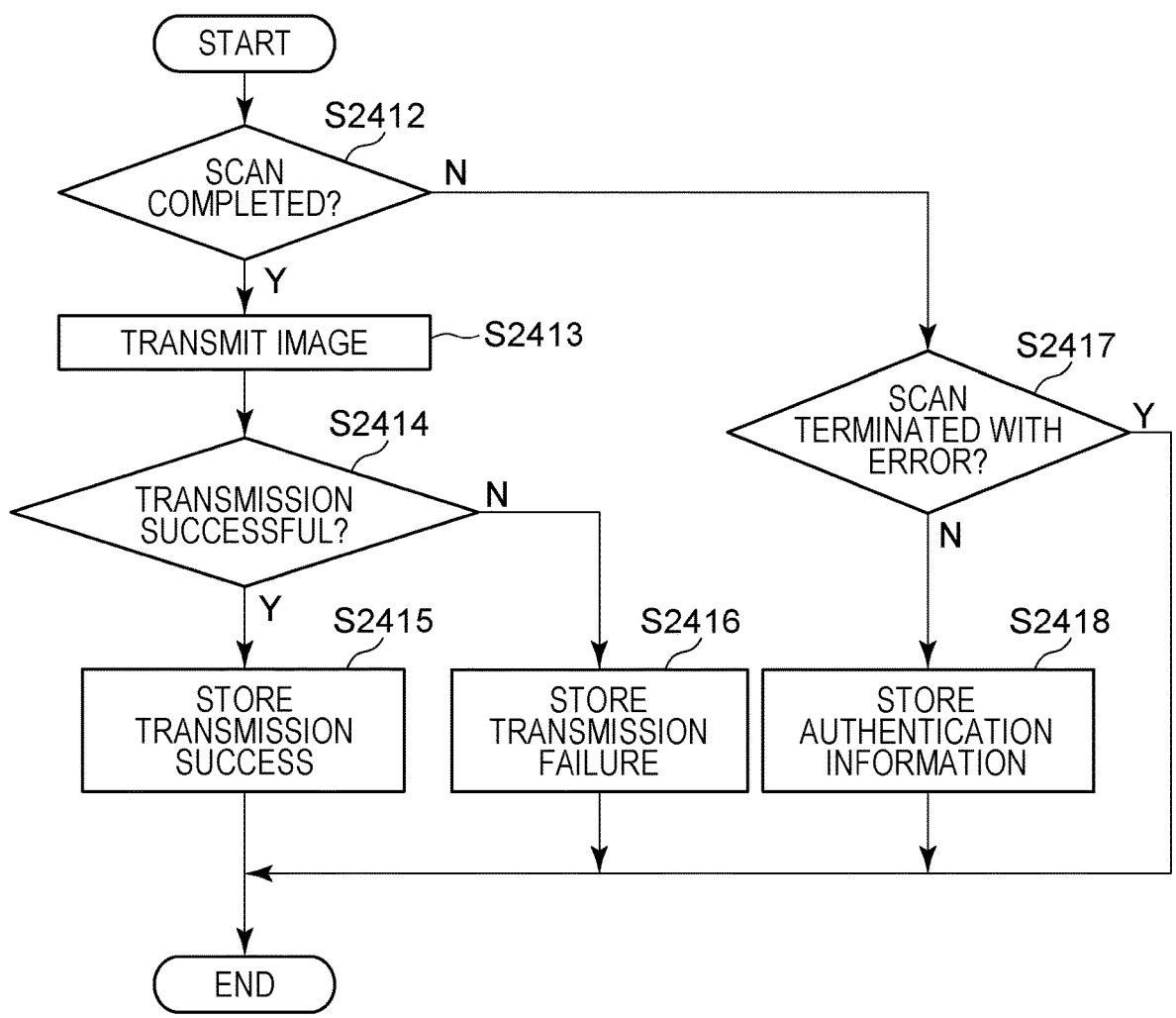

FIGS. 24A and 24B are flowcharts of the scanning process performed by the image forming apparatus 101 according to the second embodiment. Each of the processes in the flowchart illustrated in FIGS. 24A and 24B is performed by the CPU 202 of the image forming apparatus 101 loading the program stored in the ROM 204 into the RAM 203 and executing the program. Upon receiving the scan job ticket in the form of the HTTP POST request from the information terminal 102, the CPU 202 of the image forming apparatus 101 starts the scanning process (FIG. 24A).

In S2401, the CPU 202 of the image forming apparatus 101 generates job information including a job ID, which is the ID indicating a job, on the basis of the job settings and the service URL transmitted using the scan job ticket and stores the job information in the storage 205.

In S2402, the CPU 202 of the image forming apparatus 101 attaches the job ID of the scan job to HTTP response data having the HTTP response status code "200" and transmits the HTTP response data as a response to the scan job ticket.

In S2403, the CPU 202 of the image forming apparatus 101 performs scanning on the basis of the scan job information generated in S2401. At this time, the scanned image is stored in the storage 205 as scanned image data in association with the job ID generated in S2402.

In S2404, the CPU 202 of the image forming apparatus 101 determines that the scan is successful if the execution result of the scan job is "success".

If, in S2404, the CPU 202 of the image forming apparatus 101 determines that the scan is successful and if the authentication primary information in the RAM 203 includes the authentication information corresponding to the job ID generated in S2402, the CPU 202 of the image forming apparatus 101 acquires the authentication information from the authentication primary information and determines in S2405 that the authentication information has been received.

If, in S2405, the CPU 202 of the image forming apparatus 101 determines that the authentication information has been received, the CPU 202 of the image forming apparatus 101 transmits, in S2406, the image data transmission notification in the form of an HTTP POST request to the cloud server 103 on the basis of the authentication information acquired in S2405. At this time, the service URL of the scan job ticket and the scanned image data in the RAM 203 are attached to the image data transmission notification, and the image data transmission notification is transmitted.

In S2407, the CPU 202 of the image forming apparatus 101 determines that the transmission is successful if the transmission result in the response to the image data transmission notification transmitted in S2406 is "transmission success".

If, in S2407, the CPU 202 of the image forming apparatus 101 determines that the transmission is successful, the CPU 202 of the image forming apparatus 101 stores, in S2408, the job status "transmission success" into the job information in the storage 205 corresponding to the job ID of the job generated in S2402.

If, in S2407, the CPU 202 of the image forming apparatus 101 determines that the transmission is not successful, the CPU 202 of the image forming apparatus 101 stores, in S2409, the job status "transmission failure" into the job information in the storage 205 corresponding to the job ID of the job generated in S2402.

If, in S2404, the CPU 202 of the image forming apparatus 101 determines that the scan is not successful, the CPU 202 of the image forming apparatus 101 stores, in S2410, the job status "scan failure" into the job information in the storage 205 corresponding to the job ID of the job generated in S2401.

If, in S2405, the CPU 202 of the image forming apparatus 101 determines that the authentication information has not been received, the CPU 202 of the image forming apparatus 101 stores, in S2411, the job ID of the job generated in S2401 and the image scanned in S2403 into the RAM 203.

In S2411, the CPU 202 of the image forming apparatus 101 stores the job status "scan success" into the job information in the storage 205 corresponding to the job ID of the job generated in S2401.

Upon receiving, from the information terminal 102, the authentication ticket in the form of an HTTP POST request, the CPU 202 of the image forming apparatus 101 starts the scanning process (FIG. 24B).

In S2412, the CPU 202 of the image forming apparatus 101 determines that the scan has been completed if the job status in the job information in the storage 205 corresponding to the job ID in the received authentication ticket is "scan success".

If, in S2412, the CPU 202 of the image forming apparatus 101 determines that the scan has been completed, the processing proceeds to S2413. In S2413, the CPU 202 of the image forming apparatus 101 transmits an image data transmission notification in the form of an HTTP POST request. The service URL stored in the job information in the storage 205 corresponding to the job ID acquired from the authentication ticket is attached to the image data transmission notification. In addition, attached to the image data transmission notification is the scanned image data in the storage 205 corresponding to the job ID acquired from the authentication ticket on the basis of the authentication information in the authentication ticket.

If, in S2414, the transmission result in the response to the image data transmission notification transmitted in S2413 is "transmission success", the CPU 202 of the image forming apparatus 101 determines that the transmission is successful.

In addition, if, in S2414, the CPU 202 of the image forming apparatus 101 determines that the transmission is successful, the CPU 202 of the image forming apparatus 101 stores, in S2415, the job status "transmission success" into the job information of the storage 205 corresponding to the job ID acquired by the authentication ticket.

However, if, in S2414, the CPU 202 of the image forming apparatus 101 determines that the transmission is not successful, the CPU 202 of the image forming apparatus 101 stores, in S2416, the job status "transmission failure" into the job information of the storage 205 corresponding to the job ID acquired from the authentication ticket.

If, in S2412, the CPU 202 of the image forming apparatus 101 determines that the scan has not been completed and if the job status in the job information in the storage 205 corresponding to the job ID in the received authentication ticket is "scan failure", the CPU 202 of the image forming apparatus 101 determines in S2417 that the scan is terminated with error.

If, S2417, the CPU 202 of the image forming apparatus 101 determines that a scan error does not occur, the CPU 202 of the image forming apparatus 101 stores, in S2418, the authentication information corresponding to the job ID in the received authentication ticket into the authentication primary information in the RAM 203.

Third Sequence to Perform Scan and Authentication in Parallel

Figure 25:
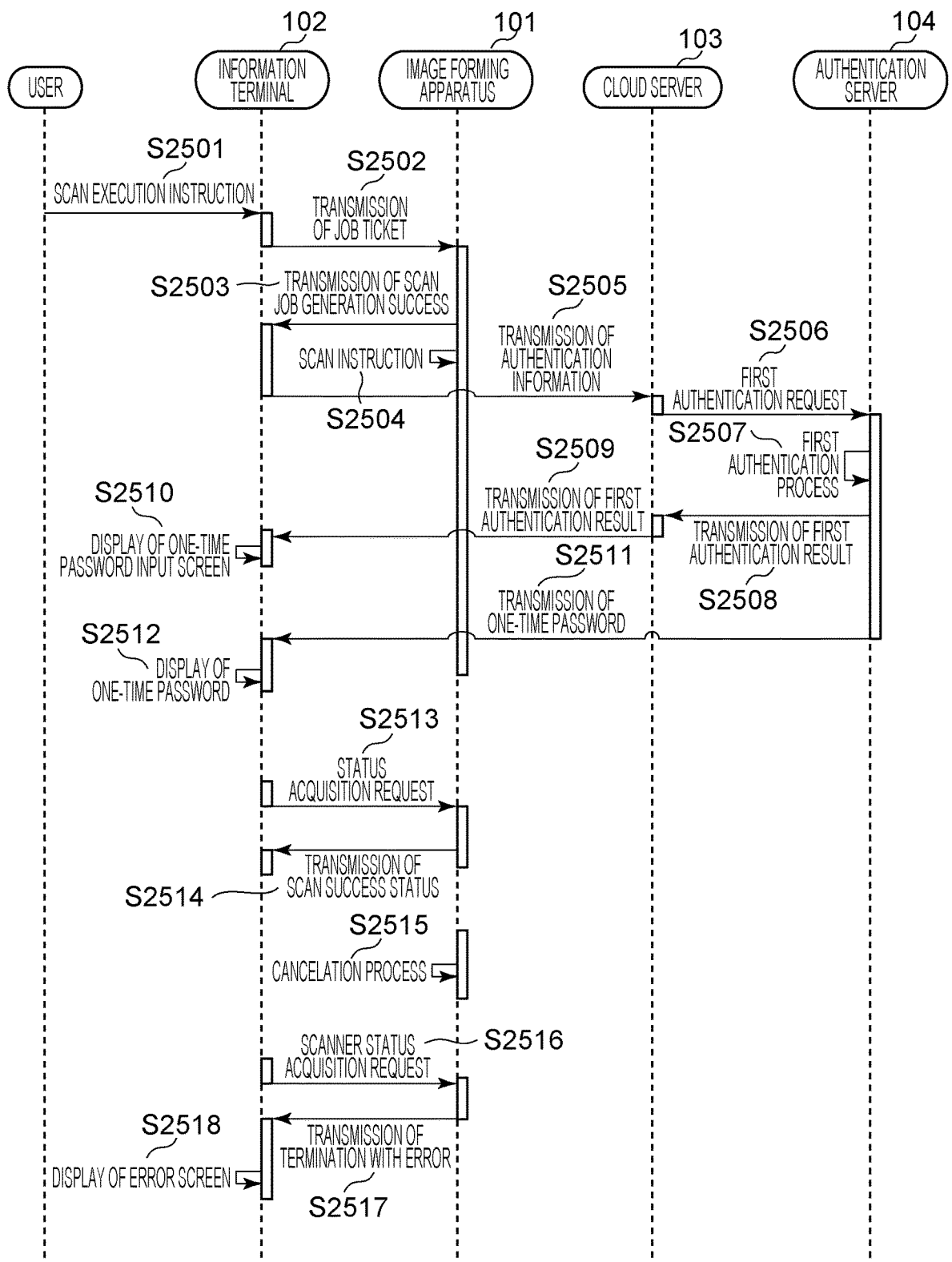
FIG. 25 is a sequence diagram illustrating fourth scan control according to the embodiment.

FIG. 25 is a sequence diagram illustrating an example of the case in which two-factor authentication at the cloud server 103 and the scan job instruction to transmit an image to the cloud server 103 are performed at the same time, and a timeout error occurs during the authentication information waiting period, according to the second embodiment of the present disclosure.

According to the present embodiment, a scan job execution technique is described in settings where the cloud server 103 requires two-factor authentication for write permission, and the two-factor authentication is performed via the information terminal 102 before the scan job is executed. In addition, according to the present embodiment, the information terminal 102, the image forming apparatus 101, the cloud server 103, and the authentication server 104 perform communication using HTTP. Then, when the one-time password is sent from the authentication server 104 to the information terminal 102, SMS is used over a public line, and the information terminal 102 and the cloud server 103 perform primary authentication by basic authentication.

In S2501, the user uses a scan application on the information terminal 102 to designate a device via the device selection screen 1000 and perform scan job setting via the scan setting screen 1003. Thereafter, the user presses the scan start button 1008 in the scan setting screen 1003.

In S2502, the CPU 302 of the information terminal 102 generates a job command on the basis of the scan job settings set in S2501 and the service URL "https://aaa.com/Storage1" set in S2501. Then, the CPU 302 of the information terminal 102 performs a process of transmitting a scan job ticket (FIG. 22) to the image forming apparatus 101 designated in S2501.

In S2503, the CPU 202 of the image forming apparatus 101 generates a job on the basis of the scan job ticket received in S2502. Then, the CPU 202 performs a process of transmitting, to the information terminal 102, HTTP response data including a job ID which is the ID of the generated job and the HTTP response status code "200" and having, attached thereto, "job in progress" indicating that the job is in progress.

In S2504, the CPU 202 of the image forming apparatus 101 starts a scan job based on the scan job generated in S2503.

In S2505, the CPU 202 of the information terminal 102 transmits, to the cloud server 103 corresponding to the service URL set in S2501, the first authentication request in the form of an HTTP POST request. At this time, the user ID "user1" and the password "password1" corresponding to the service URL stored in the storage 305 are attached to the first authentication request, and the first authentication request is transmitted. In this example, the service URL set in S2501 is "https://aaa.com/Storage1".

In S2506, the CPU 402 of the cloud server 103 redirects the HTTP POST request received in S2505 to the authentication server 104.

In S2507, the CPU 502 of the authentication server 104 performs the first authentication process (FIG. 9A).

In S2508, the CPU 502 of the authentication server 104 transmits, to the cloud server 103, HTTP response data including the HTTP response status code "200" and the detailed status "transmission result notification" as a response to the first authentication request.

In S2509, the CPU 402 of the cloud server 103 redirects the HTTP response data received in S2508 to the information terminal 102.

In S2510, the CPU 302 of the information terminal 102 causes the display unit 308 to display the one-time password input screen 1009.

In S2511, the CPU 502 of the authentication server 104 transmits the one-time password "1111" generated in the first authentication process to the information terminal 102 using SMS over the public line 106.

In S2512, the CPU 302 of the information terminal 102 causes the display unit 308 to display the one-time password "1111" received in S2511 via an SMS application (not illustrated).

In S2513, the CPU 302 of the information terminal 102 transmits an HTTP POST request for status acquisition to the image forming apparatus 101.

In S2514, the CPU 202 of the image forming apparatus 101 receives the HTTP POST request for status acquisition transmitted in S2513 before transmission of the image data is completed. Thereafter, the CPU 202 performs a process of transmitting, to the information terminal 102, HTTP response data having the HTTP response status code "200" and having the job status "job in progress" attached thereto. At this time, the CPU 302 of the information terminal 102 continues to display the scan in progress screen 1013 as long as the job status received in S2514 is "job in progress".

If the CPU 202 of the image forming apparatus 101 has not received the authentication ticket after the time-out period specified in the scan job ticket has elapsed since reception of the scan job ticket in S2502, the CPU 202 performs a job cancellation process in S2515. Then, the CPU 202 sets the job status in the job information corresponding to the job ID in the scan job ticket received in S2502 to "job failure". According to the present embodiment, because the time-out period is set to 300 in the scan job ticket example illustrated in FIG. 22, the job is canceled if the authentication ticket is not received even after 300 seconds from S2502. Since the user may input the one-time password and send the authentication ticket before the expiration date of the one-time password is reached, it is desirable that the time-out period be set so that the time at which the time-out period elapses is later than the expiration date of the one-time password.

In S2516, the CPU 302 of the information terminal 102 transmits an HTTP POST request for status acquisition to the image forming apparatus 101.

In S2517, the CPU 202 of the image forming apparatus 101 transmits, to the information terminal 102, HTTP response data having the HTTP response status code "200" and having, attached thereto, the job status "scan failure".

In S2518, the CPU 302 of the information terminal 102 causes the display unit 308 to display the error screen 1016.

The present embodiment has been described with reference to the second scan control sequence, the third scan control sequence, and the fourth scan control sequence as a method for controlling the image forming apparatus using the authentication information acquired via two-factor authentication. However, the method is not limited thereto.

As described above, by employing two-factor authentication, the image forming apparatus can receive control instructions only from the information terminal used by the user, so that a spoofing attack can be prevented. In addition, when scanning is performed using two-factor authentication, the operation of the user and the processing of the device can be performed simultaneously and, thus, burden of operation by the user can be reduced.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-131091, filed Aug. 11, 2021, which is hereby incorporated by reference herein in its entirety.

What is claimed is:

1. An image processing system comprising:
an image processing apparatus; and
an information terminal,
wherein the image processing apparatus reads a document,
wherein the image processing apparatus transmits, to an external apparatus, image data generated by reading the document,
wherein the information terminal receives user information from a user, wherein the information terminal transmits the received user information to an authentication server, wherein the information terminal receives, from the user, a code transmitted by the authentication server, wherein the information terminal further transmits information used to cause the image processing apparatus to perform a process of reading the document, wherein the information terminal transmits the information to the image processing apparatus without waiting for reception of the code by the information terminal, and wherein the image processing apparatus transmits the image data to the external apparatus in response to the reception of the code by the information terminal.

2. The image processing system according to claim 1, wherein the information terminal transmits, to the authentication server, the code input by the information terminal, and wherein the image processing apparatus transmits the image data to the external apparatus in response to receiving a notification indicating that authentication based on the code is successful from the authentication server.

3. The image processing system according to claim 1, wherein the external apparatus is different from the information terminal.

4. The image processing system according to claim 1, wherein the external apparatus is the information terminal.

5. An image processing system comprising:

an image processing apparatus; and an information terminal, wherein the image processing apparatus receives image data from an external apparatus, wherein the image processing apparatus performs printing based on the image data received by the image processing apparatus, wherein the information terminal receives user information from a user, wherein the information terminal transmits the received user information to an authentication server, wherein the information terminal receives, from the user, a code transmitted by the authentication server, wherein the information terminal further transmits information used to cause the image processing apparatus to perform printing based on the image data, wherein the information terminal transmits the information to the image processing apparatus without waiting for reception of the code by the information terminal, and wherein the image processing apparatus performs printing based on the image data in response to the reception of the code by the information terminal.

6. The image processing system according to claim 5, wherein the information terminal transmits, to the authentication server, the code input by the information terminal, and wherein the image processing apparatus performs printing based on the image data in response to receiving a notification indicating that authentication based on the code is successful from the authentication server.

7. A method for controlling an image processing system including an image processing apparatus and an information terminal, the method comprising:

reading, by the image processing apparatus, a document;

transmitting, by the image processing apparatus, to an external apparatus, image data generated by reading the document;

receiving, by the information terminal, user information from a user;

transmitting, by the information terminal, the received user information to an authentication server; and receiving, from the user by the information terminal, a code transmitted by the authentication server, wherein, by the information terminal, information used to cause the image processing apparatus to perform a process of reading the document is further transmitted, wherein the information is transmitted to the image processing apparatus without waiting for reception of the code by the information terminal, and wherein the image data is transmitted to the external apparatus by the image processing apparatus in response to the reception of the code by the information terminal.

8. A method for controlling an image processing system including an image processing apparatus and an information terminal, the method comprising:

receiving, by the image processing apparatus, image data from an external apparatus;

performing, by the image processing apparatus, printing based on the received image data;

receiving, by the information terminal, user information from a user;

transmitting, by the information terminal, the received user information to an authentication server; and receiving, from the user by the information terminal, a code transmitted by the authentication server, wherein, by the information terminal, information used to cause the image processing apparatus to perform printing based on the image data is further transmitted, wherein the information is transmitted by the information terminal to the image processing apparatus without waiting for reception of the code by the information terminal, and wherein the image processing apparatus performs printing based on the image data in response to the reception of the code by the information terminal.

9. A non-transitory computer-readable storage medium storing one or more programs including executable instructions that, when executed by a computer, cause the computer to perform a method for controlling an image processing system including an image processing apparatus and an information terminal, the method comprising:

reading, by the image processing apparatus, a document;

transmitting, by the image processing apparatus, to an external apparatus, image data generated by reading the document;

receiving, by the information terminal, user information from a user;

transmitting, by the information terminal, the received user information to an authentication server; and receiving, from the user by the information terminal, a code transmitted by the authentication server, wherein, by the information terminal, information used to cause the image processing apparatus to perform a process of reading the document is further transmitted, wherein the information is transmitted to the image processing apparatus without waiting for reception of the code by the information terminal, and wherein the image data is transmitted to the external apparatus by the image processing apparatus in response to the reception of the code by the information terminal.

10. A non-transitory computer-readable storage medium storing one or more programs including executable instructions that, when executed by a computer, cause the computer to perform a method for controlling an image processing system including an image processing apparatus and an information terminal, the method comprising:

receiving, by the image processing apparatus, image data from an external apparatus;

performing, by the image processing apparatus, printing based on the received image data;

receiving, by the information terminal, user information from a user;

transmitting, by the information terminal, the received user information to an authentication server; and receiving, from the user by the information terminal, a code transmitted by the authentication server, wherein, by the information terminal, information used to cause the image processing apparatus to perform printing based on the image data is further transmitted, wherein the information is transmitted by the information terminal to the image processing apparatus without waiting for reception of the code by the information terminal, and wherein the image processing apparatus performs printing based on the image data in response to the reception of the code by the information terminal.

\* \* \* \* \*